US012738996B2

(12) United States Patent
Liu et al.

(10) Patent No.: US 12,738,996 B2
(45) Date of Patent: Sep. 15, 2026

(54) CHANNEL INFORMATION OBTAINING METHOD AND COMMUNICATION APPARATUS

(71) Applicant: HUAWEI TECHNOLOGIES CO., LTD., Shenzhen (CN)

(72) Inventors: Fengwei Liu, Chengdu (CN); Lei Chen, Shenzhen (CN); Xiaoyu Luo, Shanghai (CN); Gao Xiang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 284 days.

(21) Appl. No.: 18/410,726

(22) Filed: Jan. 11, 2024

(65) Prior Publication Data

US 2024/0146372 A1 May 2, 2024

Related U.S. Application Data

(63) Continuation of application No. PCT/CN2022/104806, filed on Jul. 11, 2022.

(30) Foreign Application Priority Data

Jul. 12, 2021 (CN) ......................... 202110784799.8

(51) Int. Cl.
*H04B 7/00* (2006.01)
*H04B 7/06* (2006.01)

(52) U.S. Cl.
CPC .................................. *H04B 7/0617* (2013.01)

(58) Field of Classification Search
None
See application file for complete search history.

(56) References Cited

U.S. PATENT DOCUMENTS

| | | | | |
|---|---|---|---|---|
| 2011/0205930 | A1* | 8/2011 | Rahman ................ | H04L 5/0023 370/252 |
| 2015/0341100 | A1 | 11/2015 | Kwak et al. | |
| 2016/0021551 | A1 | 1/2016 | Park et al. | |
| 2019/0036664 | A1* | 1/2019 | Liu ....................... | H04L 5/0048 |
| 2019/0081669 | A1* | 3/2019 | Wu ....................... | H04L 5/0048 |
| 2021/0266935 | A1 | 8/2021 | Wu et al. | |

FOREIGN PATENT DOCUMENTS

| | | | |
|---|---|---|---|
| CN | 111147203 | A | 5/2020 |
| JP | 2013511169 | A | 3/2013 |
| KR | 20160002724 | U | 8/2016 |

* cited by examiner

*Primary Examiner* — Abdelillah Elmejjarmi
(74) *Attorney, Agent, or Firm* — Leydig, Voit & Mayer, Ltd.

(57) ABSTRACT

A channel information obtaining method and a communication apparatus are provided. The method includes: a network device sends reference signals to a terminal device by using a plurality of antenna unit groups, where at least two antenna unit groups of the plurality of antenna unit groups belong to one antenna port; and the network device receives first information from the terminal device, where the first information indicates channel information corresponding to the plurality of antenna unit groups, so as to improve accuracy of obtained channel information.

14 Claims, 12 Drawing Sheets

First polarization direction

Second polarization direction

CHANNEL INFORMATION OBTAINING METHOD AND COMMUNICATION APPARATUS

CROSS-REFERENCE TO RELATED APPLICATIONS

This application is a continuation of International Application No. PCT/CN2022/104806, filed on Jul. 11, 2022, which claims priority to Chinese Patent Application No. 202110784799.8, filed on Jul. 12, 2021. The disclosures of the aforementioned applications are hereby incorporated by reference in their entireties.

TECHNICAL FIELD

This application relates to the communication field, and more specifically, to a channel information obtaining method and a communication apparatus.

BACKGROUND

In a mobile communication system, to implement better transmission performance on a higher frequency band, both a network device and a terminal device may use an (analog) beamforming technology to implement beam-based communication, so that uplink and downlink signal transmission capabilities can be greatly improved. Because beams are directional, beam alignment needs to be performed before data transmission is performed between the terminal device and the network device. The beam alignment between the terminal device and the network device may be implemented through a beam management procedure. For example, the terminal device determines a transmit beam of the network device and a receive beam of the terminal device by measuring a downlink signal sent by the network device.

However, in a beam management process, the terminal device needs to perform frequent downlink measurements to implement beam alignment, and the network device needs to send a large quantity of downlink signals for the terminal device to perform measurement. Resource overheads and power consumption are relatively high. Frequent measurements of the terminal device may also cause serious power consumption and heat generation problems.

SUMMARY

This application provides a channel information obtaining method and a communication apparatus, so as to improve accuracy of obtaining channel information.

According to a first aspect, a channel information obtaining method is provided. The method may be performed by a network device or a module (such as a chip) configured in (or used for) a network device. An example in which the method is performed by the network device is used below for description.

The method includes: The network device sends reference signals to a terminal device by using a plurality of antenna unit groups, where at least two antenna unit groups in the plurality of antenna unit groups belong to one antenna port; and the network device receives first information from the terminal device, where the first information indicates channel information corresponding to the plurality of antenna unit groups.

Based on the foregoing solution, the network device groups antenna units (for example, antenna array elements) of antenna ports, and transmits reference signals by using an antenna unit group as a granularity, so that the network device can obtain high-precision channel information with relatively small reference signal resource overheads. In other words, channel information corresponding to an antenna unit set with a smaller granularity can be obtained. A downlink transmit beam (or referred to as a downlink analog transmit beam) can be determined based on the high-precision channel information. Compared with a manner of obtaining a downlink transmit beam in a beam training manner, this manner can reduce resource overheads, obtain high-precision channel information, and improve accuracy of the obtained channel information.

With reference to the first aspect, in some implementations of the first aspect, the channel information corresponding to the plurality of antenna unit groups includes phase weighting information corresponding to at least one antenna unit group in the plurality of antenna unit groups, and the phase weighting information is used by the network device to control a phase shift of a phase shifter of the at least one antenna unit group.

Based on the foregoing solution, the terminal device determines, based on the obtained channel information corresponding to the antenna unit groups, the phase weighting information recommended to be used by the network device, and notifies the network device of the phase weighting information, so that the network device can determine the transmit beam based on the phase weighting information. Compared with a beam training manner in which one transmit beam is determined in a manner of attempting to send each beam, resource overheads can be reduced.

With reference to the first aspect, in some implementations of the first aspect, the plurality of antenna unit groups belong to one antenna port, or one antenna unit group in the plurality of antenna unit groups belongs to one antenna port.

With reference to the first aspect, in some implementations of the first aspect, the plurality of antenna unit groups belong to one antenna port, and that the network device sends reference signals to a terminal device by using a plurality of antenna unit groups includes: The network device sends the reference signals to the terminal device in a plurality of time units by using the plurality of antenna unit groups.

Based on the foregoing solution, the network device may separately send the reference signals in the plurality of time units by using the plurality of antenna unit groups in a time-division multiplexing manner.

With reference to the first aspect, in some implementations of the first aspect, that the network device sends the reference signals to the terminal device in a plurality of time units by using the plurality of antenna unit groups includes: The network device sends a reference signal to the terminal device in one time unit in the plurality of time units by using one antenna unit group in the plurality of antenna unit groups, where antenna unit groups used for sending the reference signals in different time units in the plurality of time units are different.

With reference to the first aspect, in some implementations of the first aspect, that the network device sends the reference signals to the terminal device in a plurality of time units by using the plurality of antenna unit groups includes: The network device sends the reference signals to the terminal device in each of the plurality of time units by using the plurality of antenna unit groups, where phase weighting sequences corresponding to different antenna unit groups in the plurality of antenna unit groups are orthogonal to each other, and one element in one phase weighting sequence is a phase weighting value corresponding to one antenna unit group in one time unit.

Based on the foregoing solution, the network device separately sends the reference signals by using the plurality of antenna unit groups in a manner of combining time-division multiplexing and code-division multiplexing.

With reference to the first aspect, in some implementations of the first aspect, a time difference between two adjacent time units in the plurality of time units is less than a threshold, or two adjacent time units in the plurality of time units are consecutive in time.

With reference to the first aspect, in some implementations of the first aspect, the channel information corresponding to the plurality of antenna unit groups includes precoding matrix indexes (PMIs) corresponding to a plurality of antenna ports, and the plurality of antenna ports include the plurality of antenna unit groups.

Based on the foregoing solution, the terminal device can determine, based on the reference signals sent by the plurality of antenna unit groups, not only the corresponding phase weighting information, but also the PMIs corresponding to the plurality of antenna ports. Resource overheads and time overheads caused when a beam training process is performed separately from a digital precoding information obtaining process can be reduced.

With reference to the first aspect, in some implementations of the first aspect, the method further includes: The network device sends configuration information to the terminal device, where the configuration information indicates an antenna unit group included in at least one antenna port of the network device.

Based on the foregoing solution, the network device may notify the terminal device of a correspondence between an antenna port and an antenna unit group by using the configuration information, so that the terminal device and the network device reach a consensus.

With reference to the first aspect, in some implementations of the first aspect, the method further includes: The network device receives second information from the terminal device, where the second information includes one or more pieces of the following information of the plurality of antenna unit groups: a signal to interference plus noise ratio (SINR), a reference signal received power (RSRP), a channel quality indicator (CQI), and/or a rank indicator (RI).

According to a second aspect, a channel information obtaining method is provided. The method may be performed by a terminal device or a module (such as a chip) configured in (or used for) the terminal device. An example in which the method is performed by the terminal device is used below for description.

The method includes: The terminal device receives a plurality of reference signals from a network device; the terminal device determines, based on the plurality of reference signals, channel information corresponding to a plurality of antenna unit groups of the network device, where at least two antenna unit groups of the plurality of antenna unit groups belong to one antenna port; and the terminal device sends first information to the network device, where the first information indicates the channel information corresponding to the plurality of antenna unit groups.

With reference to the second aspect, in some implementations of the second aspect, the channel information corresponding to the plurality of antenna unit groups includes precoding matrix indexes (PMIs) corresponding to a plurality of antenna ports, and the plurality of antenna ports include the plurality of antenna unit groups.

With reference to the second aspect, in some implementations of the second aspect, the plurality of antenna unit groups belong to one antenna port, or one antenna unit group in the plurality of antenna unit groups belongs to one antenna port.

With reference to the second aspect, in some implementations of the second aspect, the plurality of antenna unit groups belong to one antenna port; and that the terminal device receives a plurality of reference signals from a network device includes: The terminal device receives the plurality of reference signals from the network device in a plurality of time units.

With reference to the second aspect, in some implementations of the second aspect, that the terminal device receives the plurality of reference signals from the network device in a plurality of time units includes: The terminal device receives, in one time unit in the plurality of time units, a reference signal sent by the network device through one antenna unit group in the plurality of antenna unit groups, where reference signals received by different time units in the plurality of time units come from different antenna unit groups of the plurality of antenna unit groups.

With reference to the second aspect, in some implementations of the second aspect, that the terminal device receives, in the plurality of time units, reference signals sent by the network device through the plurality of antenna unit groups includes: The terminal device receives the plurality of reference signals in each of the plurality of time units.

With reference to the second aspect, in some implementations of the second aspect, that the terminal device determines, based on the plurality of reference signals, channel information corresponding to a plurality of antenna unit groups of the network device includes: The terminal device determines, based on the plurality of reference signals, a quantity of the plurality of antenna unit groups, and weighting sequences corresponding to the plurality of antenna unit groups, the channel information corresponding to the plurality of antenna unit groups.

With reference to the second aspect, in some implementations of the second aspect, the channel information of the plurality of antenna unit groups includes combining weighting information corresponding to the plurality of antenna unit groups, and the combining weighting information is weighting information obtained after phase weighting information corresponding to the plurality of antenna unit groups is combined with PMIs corresponding to the plurality of antenna unit groups; and the phase weighting information is used by the network device to control a phase shift of a phase shifter of the at least one antenna unit group.

With reference to the second aspect, in some implementations of the second aspect, the method further includes: The terminal device receives configuration information from the network device, where the configuration information indicates an antenna unit group included in at least one antenna port of the network device.

With reference to the second aspect, in some implementations of the second aspect, the method further includes: The terminal device sends second information to the network device, where the second information includes one or more pieces of the following information of the plurality of antenna unit groups: a signal to interference plus noise ratio (SINR), a reference signal received power (RSRP), a channel quality indicator (CQI), and/or a rank indicator (RI).

According to a third aspect, a channel information obtaining method is provided. The method may be performed by a network device or a module (such as a chip) configured in (or used for) a network device. An example in which the method is performed by the network device is used below for description.

The method includes: The network device sends reference signals to a terminal device by using a plurality of antenna ports, where beam directions of the reference signals sent by the plurality of antenna ports are the same; and the network device receives first information from the terminal device, where the first information indicates phase weighting information corresponding to the plurality of antenna ports, and the phase weighting information is used to control a phase shift of a phase shifter corresponding to an antenna port.

With reference to the third aspect, in some implementations of the third aspect, that the network device sends reference signals to a terminal device by using a plurality of antenna ports includes: The network device sends the reference signals on one reference signal resource by using the plurality of antenna ports.

With reference to the third aspect, in some implementations of the third aspect, that the network device sends reference signals to a terminal device by using a plurality of antenna ports includes: The network device sends the reference signals on a plurality of reference signal resources by using the plurality of antenna ports, where reference signal resources used by at least two antenna ports in the plurality of antenna ports to send reference signals are different.

With reference to the third aspect, in some implementations of the third aspect, the method further includes: The network device sends configuration information to the terminal device, where the configuration information indicates that beam directions of reference signals sent on the plurality of reference signal resources are the same.

With reference to the third aspect, in some implementations of the third aspect, the method further includes: The network device receives second information from the terminal device, where the second information includes one or more pieces of the following information of the plurality of antenna ports: a signal to interference plus noise ratio (SINR), a reference signal received power (RSRP), a channel quality indicator (CQI), and/or a rank indicator (RI).

According to a fourth aspect, a channel information obtaining method is provided. The method may be performed by a terminal device or a module (such as a chip) configured in (or used for) a terminal device. An example in which the method is performed by the terminal device is used below for description.

The method includes: The terminal device receives a plurality of reference signals from a network device; the terminal device determines, based on the plurality of reference signals, phase weighting information corresponding to a plurality of antenna ports of the network device, where the phase weighting information is used to control a phase shift of a phase shifter of an antenna port; and the terminal device sends first information to the network device, where the first information indicates the phase weighting information corresponding to the plurality of antenna ports of the network device.

With reference to the fourth aspect, in some implementations of the fourth aspect, that the terminal device receives a plurality of reference signals from a network device includes: The terminal device receives the plurality of reference signals from the network device on one reference signal resource, where the reference signal resource is a reference signal resource corresponding to the plurality of antenna ports.

With reference to the fourth aspect, in some implementations of the fourth aspect, that the terminal device receives a plurality of reference signals from a network device includes: The terminal device receives the plurality of reference signals from the network device on a plurality of reference signal resources, where at least two reference signals in the plurality of reference signals are carried on different reference signal resources.

With reference to the fourth aspect, in some implementations of the fourth aspect, the method further includes: The terminal device receives configuration information from the network device, where the configuration information indicates that beam directions of reference signals sent on the plurality of reference signal resources are the same.

With reference to the fourth aspect, in some implementations of the fourth aspect, the method further includes: The terminal device sends second information to the network device, where the second information includes one or more pieces of the following information of the plurality of antenna ports: a signal to interference plus noise ratio (SINR), a reference signal received power (RSRP), a channel quality indicator (CQI), and/or a rank indicator (RI).

According to a fifth aspect, a communication apparatus is provided, including:

a transceiver unit, configured to send reference signals to a terminal device by using a plurality of antenna unit groups, where at least two antenna unit groups in the plurality of antenna unit groups belong to one antenna port; and the transceiver unit is further configured to receive first information from the terminal device, where the first information indicates channel information corresponding to the plurality of antenna unit groups; and a processing unit, configured to determine, based on the first information, the channel information corresponding to the plurality of antenna unit groups.

With reference to the fifth aspect, in some implementations of the fifth aspect, the channel information corresponding to the plurality of antenna unit groups includes phase weighting information corresponding to at least one antenna unit group in the plurality of antenna unit groups, and the phase weighting information is used by a network device to control a phase shift of a phase shifter of the at least one antenna unit group.

With reference to the fifth aspect, in some implementations of the fifth aspect, the plurality of antenna unit groups belong to one antenna port, or one antenna unit group in the plurality of antenna unit groups belongs to one antenna port.

With reference to the fifth aspect, in some implementations of the fifth aspect, the plurality of antenna unit groups belong to one antenna port, and the transceiver unit is configured to send the reference signals to the terminal device in a plurality of time units by using the plurality of antenna unit groups.

With reference to the fifth aspect, in some implementations of the fifth aspect, the transceiver unit is configured to send a reference signal to the terminal device in one time unit in the plurality of time units by using one antenna unit group in the plurality of antenna unit groups, where antenna unit groups used for sending the reference signals in different time units in the plurality of time units are different.

With reference to the fifth aspect, in some implementations of the fifth aspect, the transceiver unit is configured to send the reference signals to the terminal device in each of the plurality of time units by using the plurality of antenna unit groups, where phase weighting sequences corresponding to different antenna unit groups in the plurality of antenna unit groups are orthogonal to each other, and one element in one phase weighting sequence is a phase weighting value corresponding to one antenna unit group in one time unit.

With reference to the fifth aspect, in some implementations of the fifth aspect, a time difference between two adjacent time units in the plurality of time units is less than a threshold, or two adjacent time units in the plurality of time units are consecutive in time.

With reference to the fifth aspect, in some implementations of the fifth aspect, the channel information corresponding to the plurality of antenna unit groups includes precoding matrix indexes (PMIs) corresponding to a plurality of antenna ports, and the plurality of antenna ports include the plurality of antenna unit groups.

With reference to the fifth aspect, in some implementations of the fifth aspect, the transceiver unit is further configured to send configuration information to the terminal device, where the configuration information indicates an antenna unit group included in at least one antenna port of the network device.

With reference to the fifth aspect, in some implementations of the fifth aspect, the transceiver unit is further configured to receive second information from the terminal device, where the second information includes one or more pieces of the following information of the plurality of antenna unit groups: a signal to interference plus noise ratio (SINR), a reference signal received power (RSRP), a channel quality indicator (CQI), and/or a rank indicator (RI).

According to a sixth aspect, a communication apparatus is provided, including: a transceiver unit, configured to receive a plurality of reference signals from a network device; and a processing unit, configured to determine, based on the plurality of reference signals, channel information corresponding to a plurality of antenna unit groups of the network device, where at least two antenna unit groups of the plurality of antenna unit groups belong to one antenna port, where the transceiver unit is further configured to send first information to the network device, where the first information indicates the channel information corresponding to the plurality of antenna unit groups.

With reference to the sixth aspect, in some implementations of the sixth aspect, the channel information of the plurality of antenna unit groups includes precoding matrix indexes (PMIs) corresponding to a plurality of antenna ports, and the plurality of antenna ports include the plurality of antenna unit groups.

With reference to the sixth aspect, in some implementations of the sixth aspect, the plurality of antenna unit groups belong to one antenna port, or one antenna unit group in the plurality of antenna unit groups belongs to one antenna port.

With reference to the sixth aspect, in some implementations of the sixth aspect, the plurality of antenna unit groups belong to one antenna port; and the transceiver unit is configured to receive the plurality of reference signals from the network device in a plurality of time units.

With reference to the sixth aspect, in some implementations of the sixth aspect, the transceiver unit is configured to receive, in one time unit in the plurality of time units, a reference signal sent by the network device through one antenna unit group in the plurality of antenna unit groups, where reference signals received by different time units in the plurality of time units come from different antenna unit groups of the plurality of antenna unit groups.

With reference to the sixth aspect, in some implementations of the sixth aspect, the transceiver unit is configured to receive the plurality of reference signals in each of the plurality of time units.

With reference to the sixth aspect, in some implementations of the sixth aspect, the processing unit is configured to determine, based on the plurality of reference signals, a quantity of the plurality of antenna unit groups, and weighting sequences corresponding to the plurality of antenna unit groups, the channel information of the plurality of antenna unit groups.

With reference to the sixth aspect, in some implementations of the sixth aspect, the channel information of the plurality of antenna unit groups includes digital weighting information of antenna ports, where the digital weighting information is used by the network device to perform digital signal processing on to-be-sent signals of antenna ports to which the plurality of antenna unit groups belong.

With reference to the sixth aspect, in some implementations of the sixth aspect, the channel information of the plurality of antenna unit groups includes combining weighting information corresponding to the plurality of antenna unit groups, and the combining weighting information is weighting information obtained after phase weighting information corresponding to the plurality of antenna unit groups is combined with PMIs corresponding to the plurality of antenna unit groups; and the phase weighting information is used by the network device to control a phase shift of a phase shifter of the at least one antenna unit group.

With reference to the sixth aspect, in some implementations of the sixth aspect, the transceiver unit is configured to receive configuration information from the network device, where the configuration information indicates an antenna unit group included in at least one antenna port of the network device.

With reference to the sixth aspect, in some implementations of the sixth aspect, the transceiver unit is further configured to send second information to the network device, where the second information includes one or more pieces of the following information of the plurality of antenna unit groups: a signal to interference plus noise ratio (SINR), a reference signal received power (RSRP), a channel quality indicator (CQI), and/or a rank indicator (RI).

According to a seventh aspect, a communication apparatus is provided, including: a transceiver unit, configured to send reference signals to a terminal device by using a plurality of antenna ports, where beam directions of the reference signals sent by the plurality of antenna ports are the same; and the transceiver unit is further configured to receive first information from the terminal device, where the first information indicates phase weighting information corresponding to the plurality of antenna ports, and the phase weighting information is used to control a phase shift of a phase shifter corresponding to an antenna port; and a processing unit, configured to determine, based on the first information, the phase weighting information corresponding to the plurality of antenna ports.

With reference to the seventh aspect, in some implementations of the seventh aspect, the transceiver unit is configured to send the reference signals on one reference signal resource by using the plurality of antenna ports.

With reference to the seventh aspect, in some implementations of the seventh aspect, the transceiver unit is configured to send the reference signals on a plurality of reference signal resources by using the plurality of antenna ports, where reference signal resources used by at least two antenna ports in the plurality of antenna ports to send reference signals are different.

With reference to the seventh aspect, in some implementations of the seventh aspect, the method further includes: the transceiver unit is configured to send configuration information to the terminal device, where the configuration information indicates that beam directions of reference signals sent on the plurality of reference signal resources are the same.

With reference to the seventh aspect, in some implementations of the seventh aspect, the method further includes: The network device receives second information from the terminal device, where the second information includes one or more pieces of the following information of the plurality of antenna ports: a signal to interference plus noise ratio (SINR), a reference signal received power (RSRP), a channel quality indicator (CQI), and/or a rank indicator (RI).

According to an eighth aspect, a communication apparatus is provided, including: a transceiver unit, configured to receive a plurality of reference signals from a network device; and a processing unit, configured to determine, based on the plurality of reference signals, phase weighting information corresponding to a plurality of antenna ports of the network device, where the phase weighting information is used to control a phase shift of a phase shifter of an antenna port; and the transceiver unit is further configured to send first information to the network device, where the first information indicates the phase weighting information corresponding to the plurality of antenna ports of the network device.

With reference to the eighth aspect, in some implementations of the eighth aspect, the transceiver unit is configured to receive the plurality of reference signals from the network device on one reference signal resource, where the reference signal resource is a reference signal resource corresponding to the plurality of antenna ports.

With reference to the eighth aspect, in some implementations of the eighth aspect, the transceiver unit is configured to receive the plurality of reference signals from the network device on a plurality of reference signal resources, where at least two reference signals in the plurality of reference signals are carried on different reference signal resources.

With reference to the eighth aspect, in some implementations of the eighth aspect, the transceiver unit is further configured to receive configuration information from the network device, where the configuration information indicates that beam directions of reference signals sent on the plurality of reference signal resources are the same.

With reference to the eighth aspect, in some implementations of the eighth aspect, the transceiver unit is further configured to send second information to the network device, where the second information includes one or more pieces of the following information of the plurality of antenna ports: a signal to interference plus noise ratio (SINR), a reference signal received power (RSRP), a channel quality indicator (CQI), and/or a rank indicator (RI).

According to a ninth aspect, a communication apparatus is provided, including a processor. The processor may implement the method in any one of the first aspect to the fourth aspect and the possible implementations of the first aspect to the fourth aspect.

Optionally, the communication apparatus further includes a memory. The processor is coupled to the memory, and may be configured to execute instructions in the memory, to implement the method in any one of the first aspect to the fourth aspect and the possible implementations of the first aspect to the fourth aspect. Optionally, the communication apparatus further includes a communication interface, and the processor is coupled to the communication interface. In this embodiment of this application, the communication interface may be a transceiver, a pin, a circuit, a bus, a module, or another type of communication interface. This is not limited.

In an implementation, the communication interface may be a transceiver or an input/output interface.

In another implementation, the communication apparatus may be a chip, the communication interface may be an input/output interface, and the processor may be a logic circuit.

Optionally, the transceiver may be a transceiver circuit. Optionally, the input/output interface may be an input/output circuit.

According to a tenth aspect, a processor is provided, and includes an input circuit, an output circuit, and a processing circuit. The processing circuit is configured to: receive a signal through the input circuit, and transmit a signal through the output circuit, to enable the processor to perform the method in any one of the first aspect to the fourth aspect and the possible implementations of the first aspect to the fourth aspect.

In an exemplary implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Exemplary implementations of the processor and the various circuits are not limited in embodiments of this application.

According to an eleventh aspect, a computer program product is provided. The computer program product includes a computer program (which may also be referred to as code or instructions). When the computer program is run, a computer is enabled to perform the method in any one of the first aspect to the fourth aspect and the possible implementations of the first aspect to the fourth aspect.

According to a twelfth aspect, a computer-readable storage medium is provided. The computer-readable storage medium stores a computer program (which may also be referred to as code or instructions). When the computer program is run on a computer, the computer is enabled to perform the method in any one of the first aspect to the fourth aspect and the possible implementations of the first aspect to the fourth aspect.

According to a thirteenth aspect, a communication system is provided, including the foregoing at least one network device and at least one terminal device.

DESCRIPTION OF EMBODIMENTS

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a 5th generation (5G) communication system, a future communication system (for example, a 6th generation (6G) communication system), or a system integrating a plurality of communication systems. This is not limited in embodiments of this application. 5G may also be referred to as new radio (NR).

Figure 1:
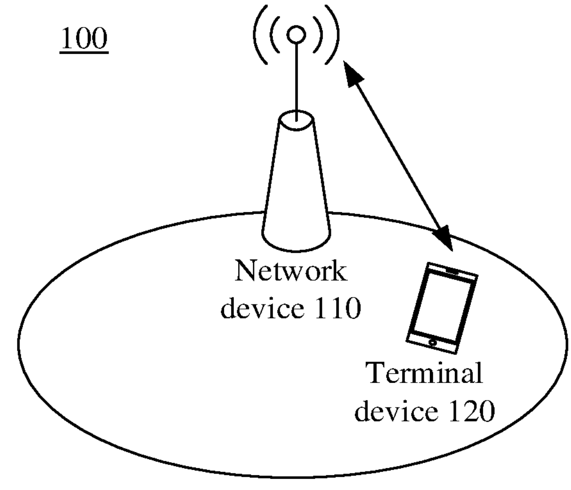
FIG. 1 is a schematic architecture of a communication system to which an embodiment of this application is applicable.

FIG. 1 is a schematic diagram of a communication system to which an embodiment of this application is applicable.

As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 and the terminal device 120 may communicate with each other through a radio link.

In embodiments of this application, communication between the network device and the terminal device includes: The network device sends a downlink signal to the terminal device, and/or the terminal device sends an uplink signal to the network device. The signal may alternatively be replaced with information, data, or the like.

In embodiments of this application, the network device may have an analog beamforming (ABF) or hybrid beamforming (HBF) architecture or function. However, this application is not limited thereto.

Figure 2:
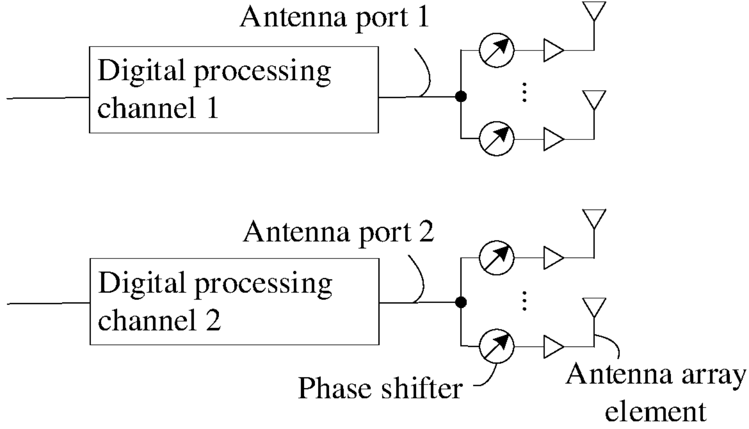
FIG. 2 is a schematic diagram of a plurality of antenna ports of a network device according to this application.

As shown in FIG. 2, the network device may include a plurality of antenna ports. The antenna port may also be referred to as a port, a digital port, a CSI-RS port, a CSI-RS antenna port, or the like. This is not limited in this application. Each antenna port of the network device corresponds to one digital processing channel, and is configured to output a signal stream processed by the digital processing channel. A digital processing channel corresponding to one antenna port is connected to a plurality of antenna array elements. This may be understood as that one antenna port includes a plurality of antenna array elements connected to a data processing channel corresponding to the antenna port. Each antenna array element may be connected to one phase shifter (or the phase shifter may also be referred to as a phase shifter). Digital processing channels corresponding to different antenna ports may be connected to different array element sets or a same array element set. In an exemplary implementation, digital processing channels corresponding to different antenna ports may be connected to different antenna subarrays (one subarray includes at least one antenna array element) and/or different antenna polarization directions. The antenna subarray is a part of an antenna array of the network device. The antenna array of the network device may be divided into a plurality of subarrays. Each subarray is connected to digital processing channels corresponding to two antenna ports, and corresponds to different antenna polarization directions.

Figures 3, 4:
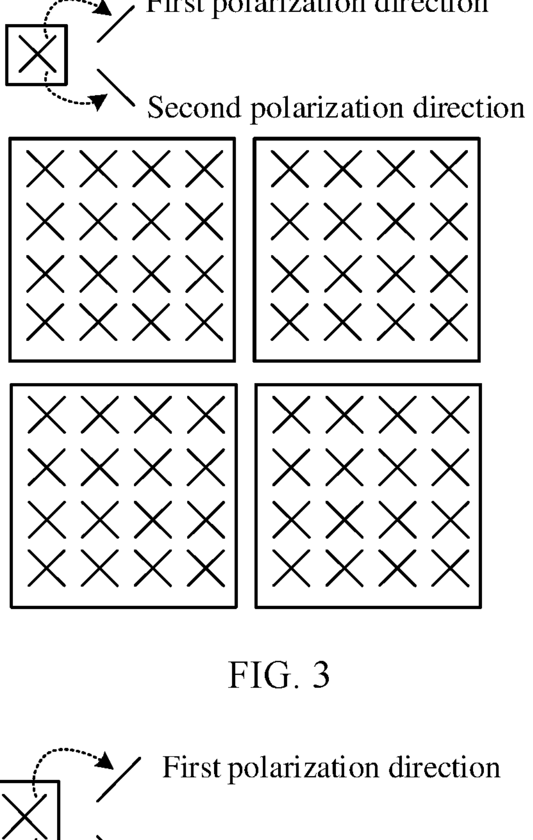
FIG. 3 is a schematic diagram in which an antenna array of a network device includes four subarrays according to this application.
FIG. 4 is a schematic diagram in which an antenna array of a network device includes two subarrays according to this application.

FIG. 3 is a schematic diagram in which an antenna array of a network device includes four subarrays. As shown in FIG. 3, each subarray is connected to two antenna ports. Specifically, a first polarization direction and a second polarization direction of each subarray are separately connected to one antenna port. The network device may include eight antenna ports. Each antenna port is configured to output a signal stream output by one digital processing channel. FIG. 4 is a schematic diagram in which an antenna array of a network device includes two subarrays. As shown in FIG. 4, each subarray is connected to two antenna ports. Specifically, a first polarization direction and a second polarization direction of each subarray are separately connected to one antenna port. The network device may include four antenna ports. Each antenna port is configured to output a signal stream output by one digital processing channel.

The technical solutions provided in embodiments of this application may be applied to various communication scenarios, for example, may be applied to one or more of the following communication scenarios: eMBB communication, URLLC, machine type communication (MTC), mMTC, device-to-device (D2D) communication, vehicle to everything (V2X) communication, vehicle to vehicle (V2V) communication, vehicle to network (V2N), vehicle to infrastructure (V2I), vehicle to pedestrian (V2P), and the Internet of Things (IoT). Optionally, mMTC may include one or more of the following communication: communication in an industrial wireless sensor network (IWSN), communication in a video surveillance scenario, communication with a wearable device, and the like.

The terminal device in embodiments of this application may also be referred to as a terminal. The terminal may be a device having a wireless transceiver function. The terminal may be deployed on land, including an indoor device, an outdoor device, a handheld device, and/or a vehicle-mounted device, may be deployed on a water surface (for example, on a ship), or may be deployed in air (for example, on an airplane, a balloon, or a satellite). The terminal device may be user equipment (UE). The UE includes a handheld device, a vehicle-mounted device, a wearable device, or a computing device having a wireless communication function. For example, the UE may be a mobile phone, a tablet computer, or a computer having a wireless transceiver function. The terminal device may alternatively be a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in a smart city, a wireless terminal in a smart home, and/or the like.

The network device in embodiments of this application includes a base station (BS), and may be a device deployed in a radio access network for wireless communication with a terminal device. The base station may be in a plurality of forms, for example, a macro base station, a micro base station, a relay station, or an access point. The base station in embodiments of this application may be a base station in a 5G system, a base station in an LTE system, or a base station in another system. This is not limited. The base station in the 5G system may also be referred to as a transmission reception point (TRP) or a next-generation NodeB (generation NodeB, gNB or gNodeB). The base station may be an integrated base station, or may be a base station that is separated into a plurality of network elements. This is not limited. For example, the base station is a base station in which a central unit (CU) and a distributed unit (DU) are separated, that is, the base station includes the CU and the DU.

In embodiments of this application, "/" may indicate an "or" relationship between associated objects. For example, A/B may indicate A or B. "And/or" may be used to describe three relationships between associated objects. For example, A and/or B may indicate the following three cases: Only A exists, both A and B exist, and only B exists, where A and B may be singular or plural. To facilitate description of the technical solutions in embodiments of this application, in embodiments of this application, terms such as "first" and "second" may be used to distinguish between technical features having same or similar functions. The terms such as "first" and "second" do not limit a quantity and an execution sequence, and the terms such as "first" and "second" do not indicate a definite difference. In embodiments of this application, a term such as "example" or "for example" indicates an example, an illustration, or a description. Any embodiment or design scheme described as an "example" or "for example" should not be explained as being more preferred or having more advantages than another embodiment or design scheme. Use of the term such as "example" or "for example" is intended to present a relative concept in a specific manner for ease of understanding.

In embodiments of this application, "at least one (type)" may alternatively be described as "one (type) or more (types)", and "a plurality of (types)" may be two (types), three (types), four (types), or more (types). This is not limited in embodiments of this application.

To better understand embodiments of this application, terms used in this specification are briefly described below.

1. Beam:

A beam is a communication resource. The beam may be a wide beam, a narrow beam, or a beam of another type. A technology for forming the beam may be a beamforming technology or another technical means. The beamforming technology may be a digital beamforming technology, an analog beamforming technology, or a hybrid digital/analog beamforming technology. Different beams may be considered as different spatial resources. A communication device may send same information or different information by using different beams. Optionally, the communication device may consider a plurality of beams that have a same or similar characteristic as one beam.

One beam may be implemented through one or more antenna ports, and is used by the communication device to transmit a data channel, a control channel, a sounding signal, and the like. For example, a transmit beam may be distribution of signal strength formed in different directions in space after a signal is transmitted through an antenna, and a receive beam may be distribution in which an antenna array enhances or weakens reception of a radio signal in different directions in space. It may be understood that the one or more antenna ports forming the beam may alternatively be considered as one antenna port set. In the current NR protocol, a downlink beam may be represented through an antenna port quasi co-located (QCL) relationship. Specifically, signals of two same beams have a QCL relationship about a spatial Rx parameter ( ) that is, QCL-Type D: {Spatial Rx parameter} in the protocol; and an uplink beam may be represented through spatial relation information. A beam may be represented through identification information of various signals, for example, a resource (identifier, ID) of a CSI-RS, a time domain index of a synchronization signal (SS)/physical broadcast channel (PBCH) block SSB, a resource ID of a sounding signal (SRS), a resource ID of a tracking signal (tracking reference signal, TRS), or the like.

2. Beam Management

A terminal device and a base station may perform beam management by using a channel state information-reference signal (CSI-RS), to implement transmit and receive beam alignment. Beam management includes beam training. The following describes a CSI-RS-based beam training process by using downlink transmission as an example.

The base station may determine a proper downlink transmit beam through beam training. The base station may configure N CSI-RS resources for the terminal device. In the beam training process, the base station may send CSI-RSs on the N CSI-RS resources by using different beams. The terminal device measures the N CSI-RS resources, and obtains a measurement result (for example, a layer 1-reference signal received power (L1-RSRP) or a layer 1-signal to interference plus noise ratio (L1-SINR)). Based on the measurement result, the terminal may report a plurality of CSI-RS resource identifiers and a corresponding reference signal received power (RSRP), so that the base station can determine an appropriate downlink transmit beam and/or a corresponding uplink receive beam.

The terminal device needs to determine an optimal receive beam through beam scanning. For example, the terminal may receive a CSI-RS resource by using different receive beams, to determine an optimal receive beam corresponding to a transmit beam of the base station. Generally, the terminal device selects and maintains a receive beam of the terminal device by itself.

Before performing downlink data transmission with the terminal device, the base station performs the foregoing beam training procedure, to determine a downlink transmit beam and/or an uplink receive beam. The base station determines the downlink transmit beam, that is, determines analog weighting values of a plurality of phase shifters corresponding to array elements of an antenna port. A beam trained in the foregoing beam training procedure may be referred to as an analog beam.

When a quantity of digital ports of the base station is greater than 1, a same analog weighting value or different analog weighting values may be selected for a plurality of phase shifters corresponding to different digital ports.

Figure 5:
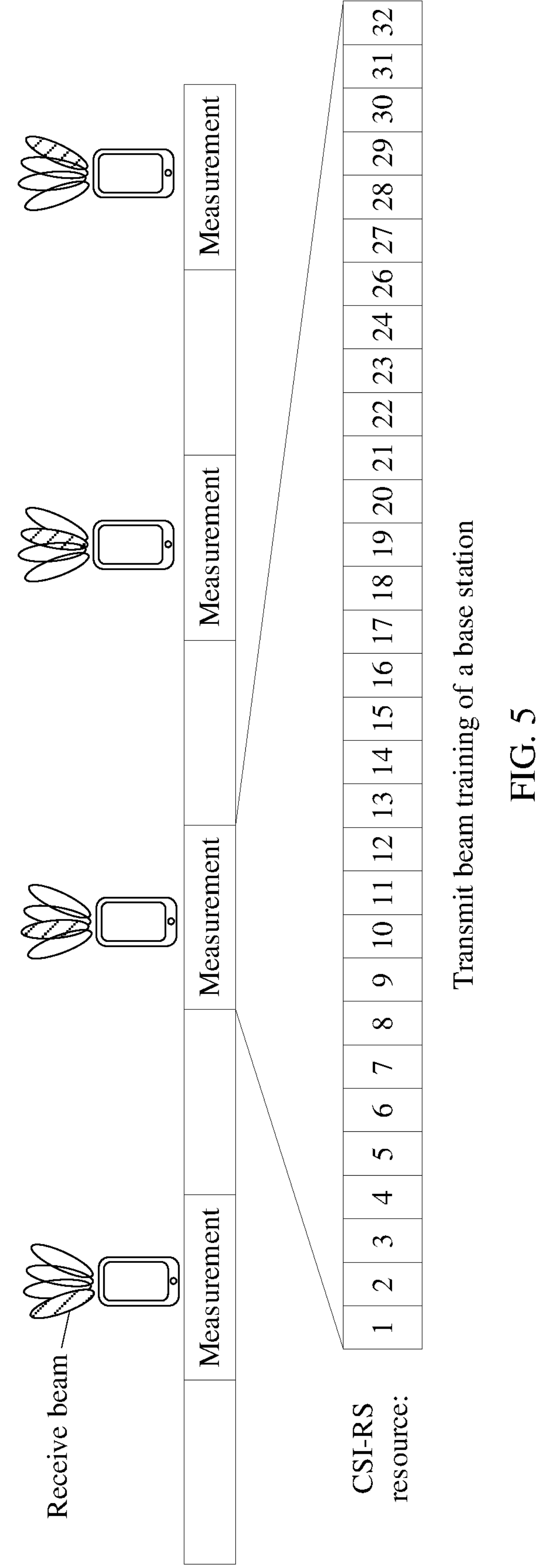
FIG. 5 is a schematic diagram of a beam training process according to this application.

FIG. 5 is a simple example of a beam training process. The base station sends CSI-RSs by using 32 beams, and the terminal device receives the CSI-RSs from the base station by using four beams. After performing 128 (32 times 4) measurements, the terminal device may determine an optimal transmit/receive beam pair, that is, an optimal transmit beam of the base station and an optimal receive beam of the terminal device.

3. Channel State Information (CSI) Obtaining Process

A CSI-RS-based downlink CSI obtaining procedure is used as an example. After the base station and the terminal device complete the beam training process, the base station obtains downlink transmit beam information, and the terminal device obtains downlink receive beam information. The base station may send a CSI-RS by using a transmit beam obtained in the beam training process. It should be understood that the CSI-RS is used to obtain CSI (CSI-RS for CSI acquisition). Correspondingly, the terminal device receives the CSI-RS by using a receive beam obtained in the beam training process, obtains corresponding CSI based on the received CSI-RS, and feeds back the corresponding CSI to the base station. The CSI fed back by the terminal device to the base station includes but is not limited to one or more of a CQI, an RI, and a PMI.

In other words, the base station determines a downlink transmit beam in the foregoing beam training process, and after obtaining an analog weighting value corresponding to the downlink transmit beam, the base station needs to further determine a precoding scheme of a digital port. In this case, the base station may obtain the CSI through a CSI obtaining procedure, and determine the precoding scheme of the digital port. When the base station has N digital channels, a typical precode determining process is as follows: (a CSI-RS-based channel measurement and feedback mechanism is assumed):

- The base station sends CSI-RSs by using N antenna ports, where the N antenna ports correspond to N digital processing channels. An analog beam corresponding to each antenna port or each digital processing channel may be determined in the foregoing beam management procedure.
- The terminal device measures a downlink channel based on the received CSI-RS from the base station, and obtains CSI information of downlink transmission. The CSI information may include but is not limited to PMI information, RI information, CQI information, and the like.
- The terminal device reports the CSI information to the base station.
- The base station determines the precoding scheme based on the CSI information, for example, determines a precoding matrix for sending data, maps data of v streams to the N digital processing channels, and sends the data from an antenna array through an antenna port.

In conclusion, currently, the beam management procedure and the CSI obtaining procedure are performed independently. Downlink CSI-RSs need to be sent in both processes, and CSI-RS resource overheads are relatively large. In this application, antenna units (for example, antenna array elements) of antenna ports are grouped, and reference signals are transmitted at a granularity of an antenna unit group, so that the network device can obtain high-precision channel information with relatively small reference signal resource overheads. In other words, channel information corresponding to an antenna unit set with a smaller granularity can be obtained. The downlink transmit beam (or referred to as a downlink analog transmit beam) can be determined based on the high-precision channel information. Compared with a manner of obtaining a downlink transmit beam in a beam training manner, this manner can reduce resource overheads, and obtain high-precision channel information.

The following describes the channel information obtaining method provided in embodiments of this application with reference to the accompanying drawings.

Figure 6:
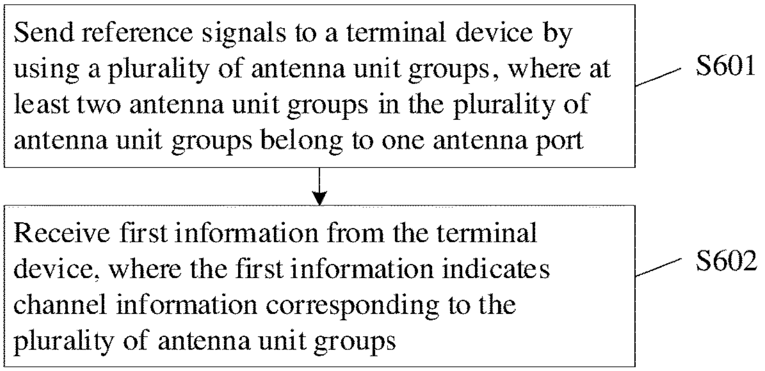
FIG. 6 is a schematic flowchart of a channel information obtaining method according to this application.

FIG. 6 is a schematic flowchart of a channel information obtaining method 600 according to an embodiment of this application. The channel measurement method may include but is not limited to the following steps.

S601: A network device sends reference signals to a terminal device by using a plurality of antenna unit groups, where at least two antenna unit groups in the plurality of antenna unit groups belong to one antenna port.

The network device may group a plurality of antenna units included in one antenna port of the network device, and the network device sends the reference signals by using the plurality of antenna unit groups obtained after the antenna ports are grouped, so that the terminal device can obtain more accurate channel information.

Figure 7:
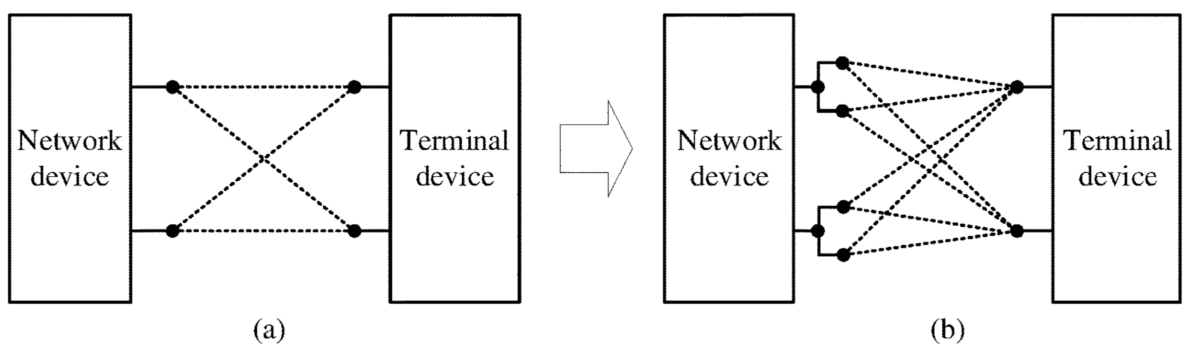
FIG. 7 is a schematic diagram of grouping antenna units in antenna ports according to an embodiment of this application.

For example, in FIG. 7, the network device includes two antenna ports, and the terminal device includes two receive antennas. The network device may send the reference signals to the terminal device by using the two antenna ports, and the terminal device may obtain a 2×2 channel matrix based on the received reference signals. However, if antenna units included in each antenna port of the network device are grouped, as shown in (b) in FIG. 7, the antenna units included in each antenna port of the network device are grouped into two antenna unit groups. The network device sends the reference signals to the terminal device by using the four antenna unit groups, and the terminal device may obtain a 2×4 channel matrix based on the received reference signals. This enables the terminal device to obtain channel information with higher precision.

An antenna unit group includes at least one antenna unit, the antenna unit may be an antenna array element, and the antenna unit group may be referred to as a virtual port. However, this application is not limited thereto. In other words, each virtual port corresponds to one array component or subarray component, indicating that each virtual port includes some antenna array elements of one array or subarray.

Optionally, one antenna port may include one antenna unit group, that is, antenna array elements included in one antenna port are one antenna unit group.

Figure 8:
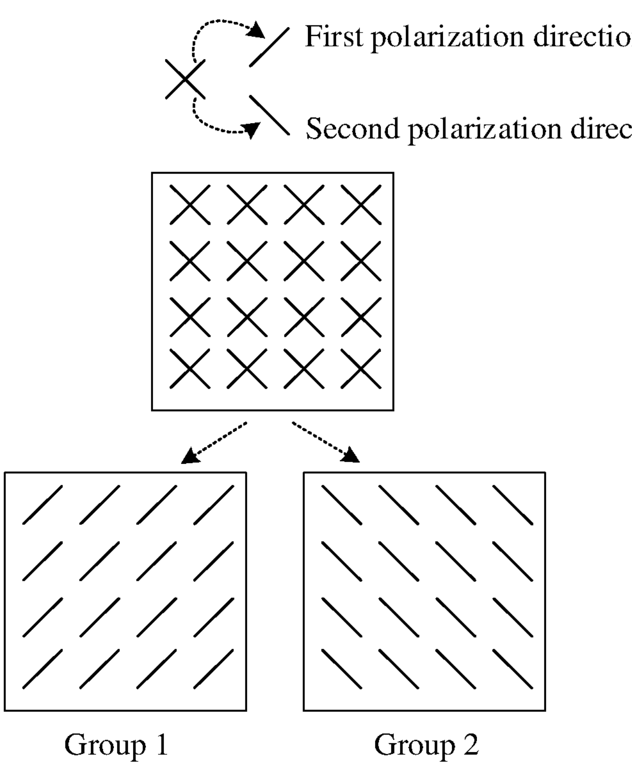
FIG. 8 is a schematic diagram in which each antenna port is one antenna unit group according to an embodiment of this application.

For example, in an antenna array including 32 array elements of the network device shown in FIG. 8, two polarization directions respectively correspond to two antenna ports, that is, a first polarization direction corresponds to one antenna port, and a second polarization direction corresponds to the other antenna port. The network device may notify the terminal device that antenna array elements included in one antenna port are one antenna unit group, that is, the antenna array includes an antenna unit group 1 and an antenna unit group 2 shown in the figure. However, this application is not limited thereto.

Optionally, one antenna port may include two antenna unit groups.

Figure 9:
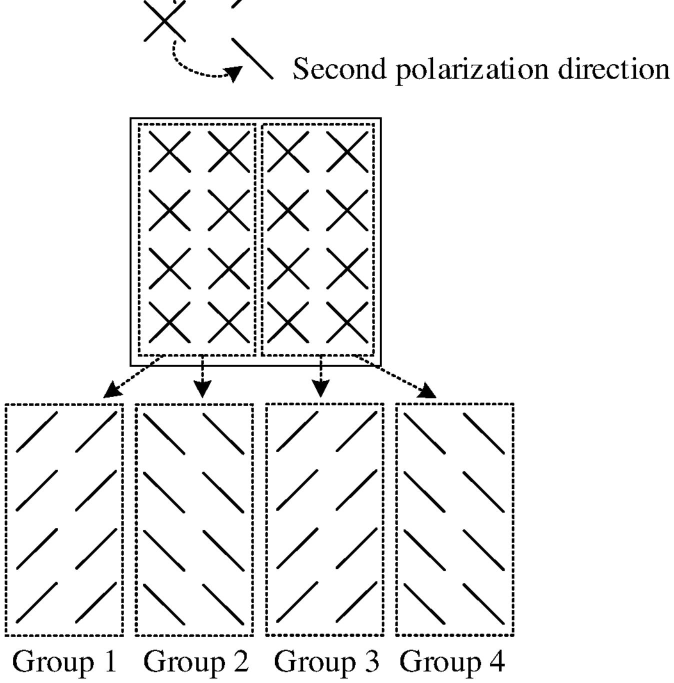
FIG. 9 and FIG. 9*a* are schematic diagrams in which each antenna port is divided into two antenna unit groups according to an embodiment of this application.

For example, in an antenna array including 32 array elements of the network device shown in FIG. 9, each polarization direction corresponds to one antenna port. As shown in FIG. 9, two vertical columns of antenna units included in one antenna port may be grouped into one antenna unit group. That is, two vertical columns in a same polarization direction may be grouped into one antenna unit group, and each antenna port includes two antenna unit groups. For example, one antenna port corresponding to the first polarization direction includes an antenna unit group 1 and an antenna unit group 3. One antenna port corresponding to the second polarization direction includes an antenna unit group 2 and an antenna unit group 4.

Figure 9A:
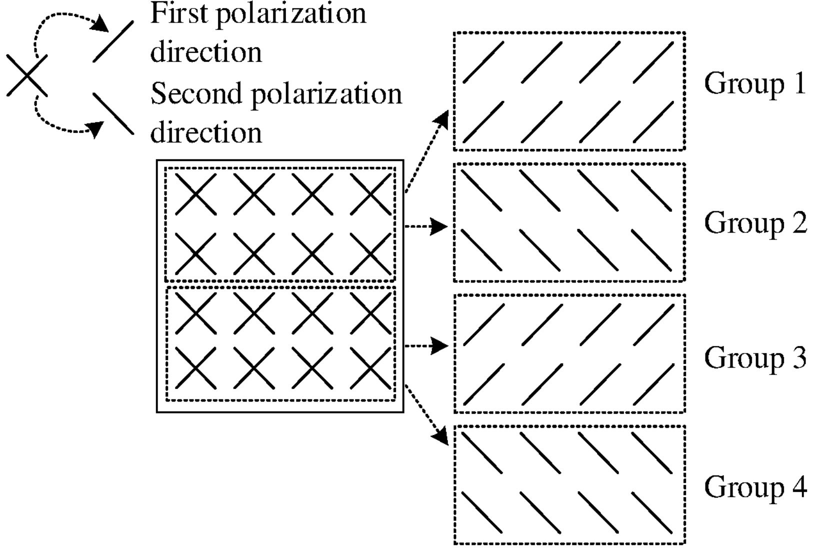

For another example, as shown in FIG. 9*a*, in an antenna array including 32 array elements, two horizontal columns of antenna units included in one antenna port may be grouped into one antenna unit group. That is, two vertical columns in a same polarization direction may be grouped into one antenna unit group, and each antenna port includes two antenna unit groups. For example, one antenna port corresponding to the first polarization direction includes an antenna unit group 1 and an antenna unit group 3, and one antenna port corresponding to the second polarization direction includes an antenna unit group 2 and an antenna unit group 4.

Optionally, one antenna port may include four antenna unit groups.

Figure 10:
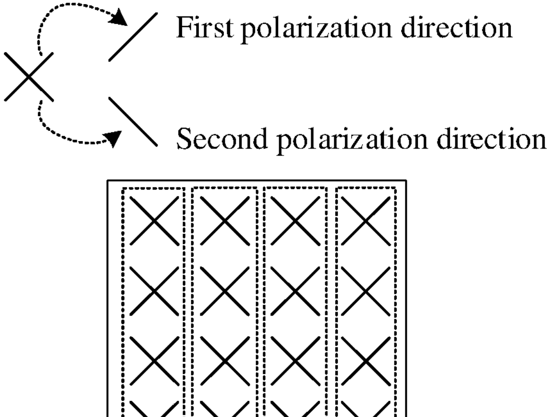
FIG. 10, FIG. 10*a*, and FIG. 10*b* are schematic diagrams in which each antenna port is divided into four antenna unit groups according to an embodiment of this application.
Figure 10A:
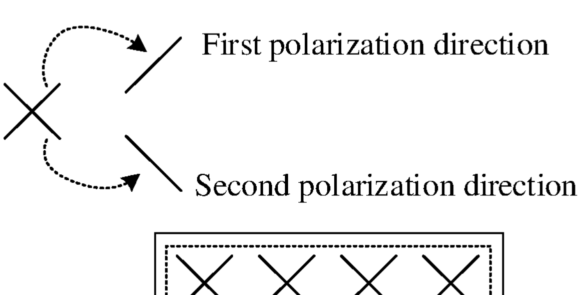
Figure 10A:
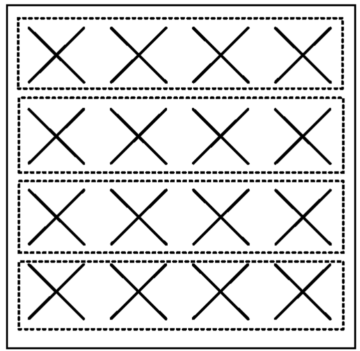
Figure 10B:
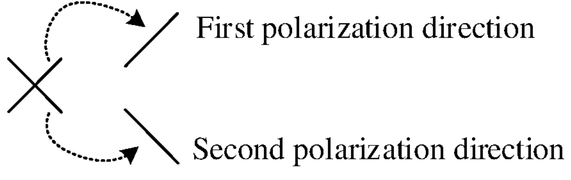
Figure 10B:
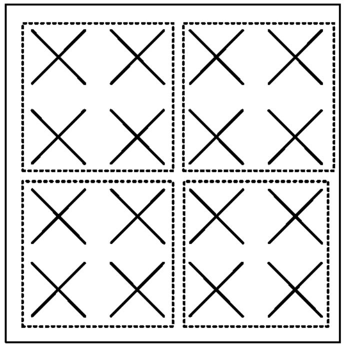

For example, for an antenna array including 32 array elements of the network device, two polarization directions correspond to two antenna ports. As shown in FIG. 10, antenna units may be grouped in a unit of a column of antenna units. Antenna units in one polarization direction in each column are one antenna unit group included in an antenna port corresponding to the polarization direction. Alternatively, as shown in FIG. 10*a*, antenna units may be grouped in a unit of a column of antenna units. Antenna units in one polarization direction in each row are one antenna unit group included in an antenna port corresponding to the polarization direction. Alternatively, as shown in FIG. 10*b*, two rows of antenna units intersecting two columns of antenna units in a same polarization direction are one group. It should be noted that the dashed line boxes in FIG. 10, FIG. 10*a*, and FIG. 10*b* include two antenna unit groups, and four antenna units in one polarization direction are one group.

Optionally, the network device may send configuration information to the terminal device, where the configuration information indicates an antenna unit group included in at least one antenna port of the network device. In other words, the configuration information indicates a correspondence between an antenna port and an antenna unit group, or the configuration information indicates grouping information of antenna units included in the at least one antenna port.

Correspondingly, the terminal device receives the configuration information from the network device, and determines the correspondence between the antenna port and the antenna unit group of the network device based on the configuration information.

Optionally, the terminal device may determine the correspondence between the antenna port and the antenna unit group based on a port number corresponding to a reference signal resource.

Figure 11:
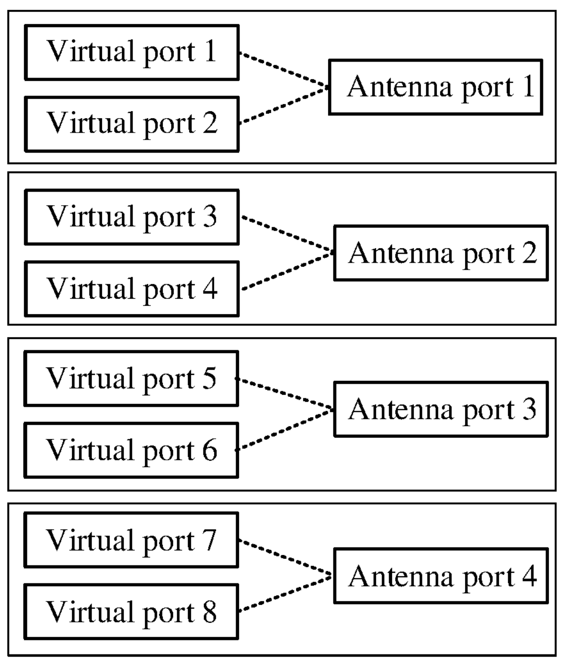
FIG. 11 is a schematic diagram of a correspondence between an antenna port and a virtual port according to an embodiment of this application.

For example, the reference signal is a CSI-RS, the network device includes four antenna ports, the network device configures, for the terminal device based on the configuration information, a CSI-RS resource corresponding to eight ports, and the terminal device determines that the eight ports corresponding to the CSI-RS resource are virtual ports (that is, antenna unit groups). Each antenna port includes two virtual ports, and numbers successively correspond to each other. As shown in FIG. 11, the terminal device may determine that in the four antenna ports of the network device, an antenna port 1 includes virtual ports 1 and 2; an antenna port 2 includes virtual ports 3 and 4; an antenna port 3 includes virtual ports 5 and 6; and an antenna port 4 includes virtual ports 7 and 8. However, this application is not limited thereto.

For another example, ports of a CSI-RS resource configured by the network device are numbered starting from 3000. For example, when one CSI-RS resource includes four antenna ports, numbers of the antenna ports of the CSI-RS resource may be respectively {3000, 3001, 3002, 3003}. The network device may configure numbers of antenna unit groups (namely, numbers of virtual ports) included in each antenna port of the CSI-RS resource. As shown in Table 1, numbers of two antenna unit groups included in the antenna port 3000 are respectively 3000-1 and 3000-2, numbers of two antenna unit groups included in the antenna port 3001 are respectively 3001-1 and 3001-2, numbers of two antenna unit groups included in the antenna port 3002 are respectively 3002-1 and 3002-2, and numbers of two antenna unit groups included in the antenna port 3003 are respectively 3003-1 and 3003-2. However, this application is not limited thereto.

TABLE 1

| Antenna port of the CSI-RS resource | Corresponding antenna unit group |
|---|---|
| 3000 | 3000-1<br>3000-2 |
| 3001 | 3001-1<br>3001-2 |
| 3002 | 3002-1<br>3002-2 |
| 3003 | 3003-1<br>3003-2 |

Alternatively, as shown in Table 2, numbers of two antenna unit groups included in the antenna port 3000 are respectively 300001 and 300002, numbers of two antenna unit groups included in the antenna port 3001 are respectively 300101 and 300102, numbers of two antenna unit groups included in the antenna port 3002 are respectively 300201 and 300202, and numbers of two antenna unit groups included in the antenna port 3003 are respectively 300301 and 300302.

It should be understood that the foregoing numbering manner of the antenna unit groups is merely an example, and another manner may alternatively be used to identify the antenna unit groups included in the antenna ports. This is not limited in this application.

TABLE 2

| Antenna port of the CSI-RS resource | Corresponding antenna unit group |
|---|---|
| 3000 | 300001<br>300002 |
| 3001 | 300101<br>300102 |
| 3002 | 300201<br>300202 |

TABLE 2-continued

| Antenna port of the CSI-RS resource | Corresponding antenna unit group |
|---|---|
| 3003 | 300301<br>300302 |

The following describes how the network device sends the reference signals to the terminal device by using the plurality of antenna unit groups, including but not limited to the following implementations.

It should be noted that, in the following implementations, an example in which a plurality of antenna unit groups belong to one antenna port is used to describe an implementation in which the network device sends the reference signals by using a plurality of antenna unit groups. When the network device includes a plurality of antenna ports, each antenna port may send a reference signal to the terminal device in one of the following manners.

The network device may send the reference signals to the terminal device in a plurality of time units by using a plurality of antenna unit groups of one antenna port. In other words, the network device sends the reference signals to the terminal device in the plurality of time units by using the plurality of antenna unit groups of one antenna port.

In an implementation, the network device sends the reference signal to the terminal device in one time unit in the plurality of time units by using one antenna unit group in the plurality of antenna unit groups, where antenna unit groups used for sending the reference signal in different time units in the plurality of time units are different.

Figure 12:
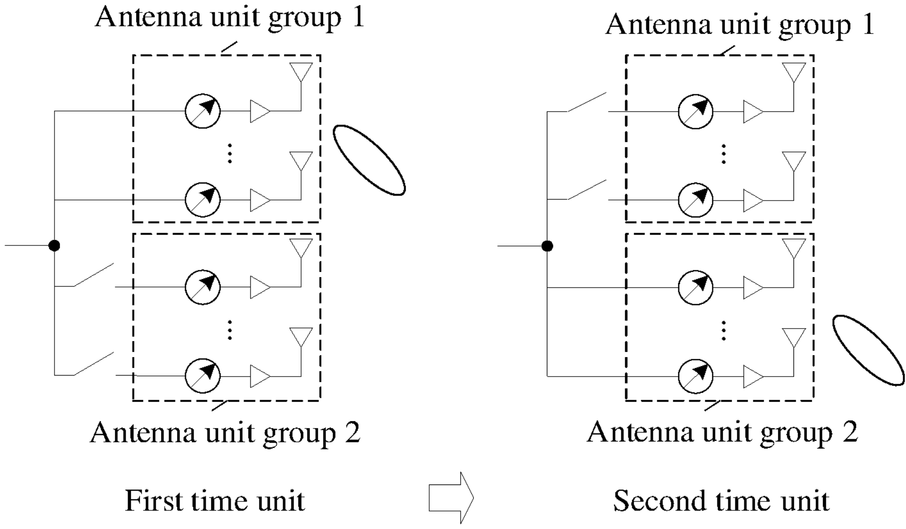
FIG. 12 is a schematic diagram of a channel information obtaining method according to an embodiment of this application.

For example, as shown in FIG. 12, one antenna port of the network device includes two antenna unit groups: an antenna unit group 1 and an antenna unit group 2. The network device may send the reference signal to the terminal device in a first time unit by using the antenna unit group 1. For example, the network device may turn off a switch of the antenna unit group 2, turn on a switch of the antenna unit group 1, and send the reference signal by using the antenna unit group 1. However, this application is not limited thereto. The network device may send the reference signal to the terminal device in a second time unit by using the antenna unit group 2. For example, the network device may turn off the switch of the antenna unit group 1, turn on the switch of the antenna unit group 2, and send the reference signal by using the antenna unit group 2. However, this application is not limited thereto. Correspondingly, the terminal device may receive the reference signals from the network device in the first time unit and the second time unit. The terminal device may separately determine, based on the received two reference signals, channel information corresponding to a channel between the antenna unit group 1 of the network device and the terminal device, and channel information corresponding to a channel between the antenna unit group 2 of the network device and the terminal device.

In this example, the manner in which the network device sends the reference signals by using the plurality of antenna unit groups of one antenna port may be referred to as time-division multiplexing (TDM).

By way of example instead of limitation, the channel information in this application may be channel state information CSI.

Figure 13:
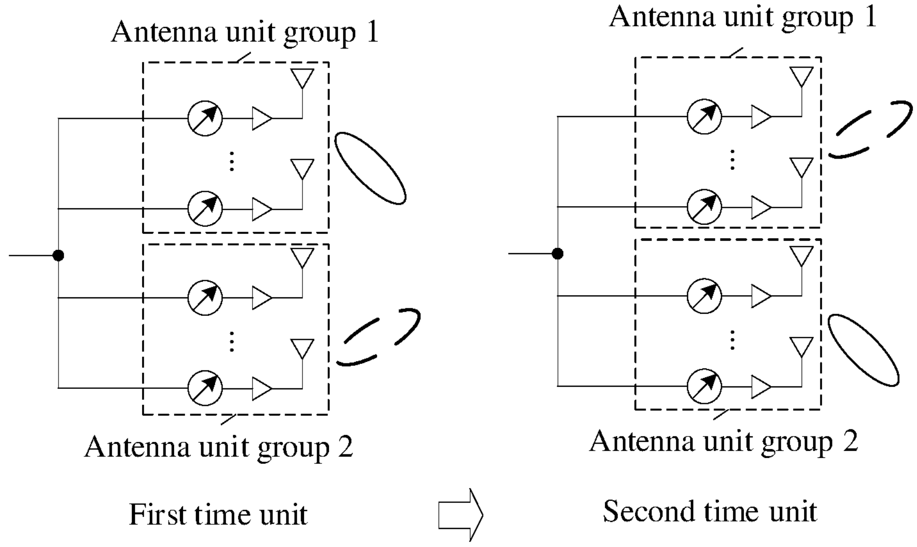
FIG. 13 is another schematic diagram of a channel information obtaining method according to an embodiment of this application.

For another example, as shown in FIG. 13, one antenna port of the network device includes two antenna unit groups: an antenna unit group 1 and an antenna unit group 2. In a first time unit, the network device may send a reference signal to the terminal device by using the antenna unit group 1, and send a reference signal to another direction by using the antenna unit group 2. For example, the antenna unit groups 1 and 2 may send the reference signals in different directions, and spatial orthogonality may be formed, so that the terminal device can receive, in the first time unit, only the reference signal sent by the antenna port group 1, but cannot receive the reference signal sent by the antenna unit group 2. In a second time unit, the network device may send a reference signal to the terminal device by using the antenna unit group 2, and send a reference signal to another direction by using the antenna unit group 2. In this way, the terminal device can receive, in the second time unit, only the reference signal sent by the antenna port group 2, but cannot receive the reference signal sent by the antenna unit group 1.

In this example, the manner in which the network device sends the reference signals by using the plurality of antenna unit groups of one antenna port may be referred to as a time-division multiplexing (TDM) manner, or a multiplexing manner of time-division (TD) and spatial-division (SD) combination.

In another implementation, the network device sends the reference signal to the terminal device in each of the plurality of time units by using the plurality of antenna unit groups, where orthogonal weighting sequences corresponding to different antenna unit groups in the plurality of antenna unit groups are orthogonal to each other, and one element in one orthogonal weighting sequence is a phase weighting coefficient used for one antenna unit group in one time unit.

Figure 14:
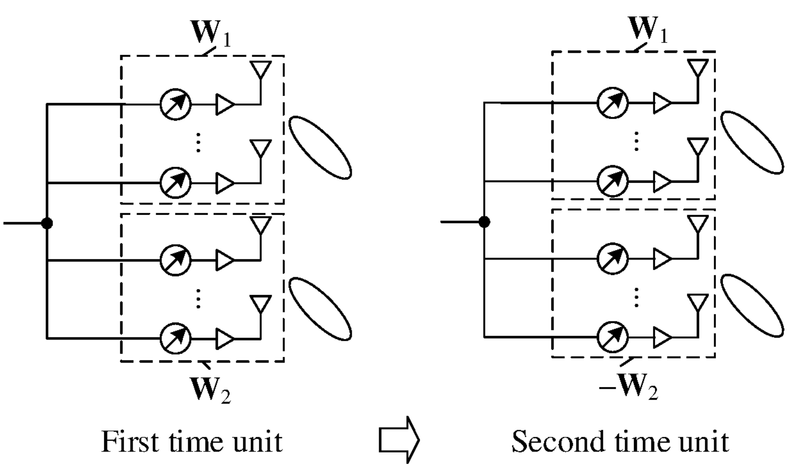
FIG. 14 is still another schematic diagram of a channel information obtaining method according to an embodiment of this application.

This manner may be referred to as a manner of time-division multiplexing and code-division multiplexing (CDM) combination, that is, a TD-CDM manner. For example, as shown in FIG. 14, one antenna port of the network device includes two antenna unit groups: an antenna unit group 1 and an antenna unit group 2. The network device sends reference signals to the terminal device in a first time unit by using the antenna unit group 1 and the antenna unit group 2, where a phase weighting sequence corresponding to the antenna unit group 1 in the first time unit is $W_1=[w_{11}, w_{12}, \ldots]^T$, and a phase weighting sequence corresponding to the antenna unit group 2 is $W_2=[w_{21}, w_{22}, \ldots]^T$. A dimension of the antenna unit group 1 in the corresponding phase weighting sequence (that is, a quantity of elements included in the phase weighting sequence) is equal to a quantity of array elements included in the antenna unit group.

Assuming that a reference signal sent by the antenna port to which the antenna unit group 1 and the antenna unit group 2 belong is denoted as x[1], the signals sent by the antenna unit group 1 and the antenna unit group 2 in the first time unit may be denoted as $W_1 \cdot x[1]$ and $W_2 \cdot x[1]$ respectively. If the terminal device receives a signal from the network device by using a single antenna or a single channel, a channel from the antenna port group 1 to the terminal device and a channel from the antenna port group 2 to the terminal device may be denoted as $h_1=[h_{11}, h_{12}, \ldots]$ and $h_2=[h_{21}, h_{22}, \ldots]$ respectively. A received signal from the antenna unit group 1 to the terminal device and a received signal from the antenna unit group 2 to the terminal device are $y1[1]=h_1 \cdot W_1 \cdot x$ and $y2[2]=h_2 \cdot W_2 \cdot x$ respectively. A signal received by the terminal device is a superposition of the two received signals from the antenna unit group 1 and the antenna unit group 2, as shown in formula (1):

$$y[1]=y[1]+y2[1]=h_1\cdot W_1\cdot x[1]+h_2\cdot W_2x\cdot[1] \quad [1]$$

The network device sends reference signals x[2] to the terminal device in a second time unit by using the antenna unit group 1 and the antenna unit group 2. A phase weighting sequence corresponding to the antenna unit group 1 in the second time unit is $W_1$, and a phase weighting sequence corresponding to the antenna unit group 2 is $-W_2$. A signal received by the terminal device is a superposition of the two received signals from the antenna unit group 1 and the antenna unit group 2:

$$y[2]=y1[2]+y2[2]=h_1\cdot W_1\cdot x[2]-h_2\cdot W_2\cdot x[2] \quad [2]$$

Both x[1] and x[2] are known reference signals, and x[1] and x[2] may be the same or different. Initial channel estimation may be obtained through elimination of x with reference to the foregoing formulas (1) and (2).

$$h[1]=h_1\cdot W_1+h_2\cdot W_2$$

$$h[2]=h_1\cdot W_1-h_2\cdot W_2$$

The terminal device demultiplexes time domain CDM, and may estimate channels $h_1\cdot W_1$ and $h_1\cdot W_2$ as follows:

$$h[1]+h[2]=2\cdot h_1\cdot W_1$$

$$h[1]-h[2]=2\cdot h_2\cdot W_2$$

Because the terminal device needs to estimate the channels $h_1\cdot W_1$ and $h_2\cdot W_2$ that are from the antenna unit group 1 and the antenna unit group 2 to a receive antenna and that are obtained after beamforming, the terminal device does not need to separately estimate $h_1$ and $h_2$. The terminal device may use $W_1$ and $W_2$ as a part of channel information obtained through channel measurement. In this case, the terminal device may consider that the signals sent by the network device in the first time unit and the second time unit are:

$$z[1]=x[1]+x[1]$$

$$z[2]=x[2]-x[2]$$

It can be learned from the foregoing inference that, in the two time units, the reference signals sent by the antenna unit group 1 are [x[1], x[2]], and the reference signals sent by the antenna unit group 2 are [x[1], −x[2]]. Therefore, an orthogonal weighting sequence corresponding to the antenna unit group 1 is [1, 1], and an orthogonal weighting sequence corresponding to the antenna unit group 2 is [1, −1]. The orthogonal weighting sequence corresponding to the antenna unit group 1 and the orthogonal weighting sequence corresponding to the antenna unit group 2 are orthogonal to each other.

An orthogonal weighting sequence corresponding to an antenna unit group may be referred to as a CDM sequence or orthogonal cover code (OCC). However, this application is not limited thereto.

In the foregoing examples, a quantity of antenna unit groups included in one antenna port is 2, and different antenna unit groups implement orthogonalization by using OCC sequences, that is, orthogonal weighting sequence groups (or orthogonal code) are [1, 1] and [1, −1].

The foregoing solution may be extended to more antenna unit groups. When one antenna port includes N antenna unit groups, the network device may send the reference signals in N time units by using the N antenna unit groups, and a signal sent in an $n^{th}$ time unit may be denoted as:

$$z[n]=a_1[n]\cdot x[n]+\ldots+a_k[n]\cdot x[n]+\ldots+a_N[n]\cdot x[n].$$

In this case, an $n^{th}$ element of an orthogonal weighting sequence of a $k^{th}$ antenna unit group may be denoted as $a_k[n]$.

For example, if one antenna port includes four antenna unit groups, orthogonal sequence groups (or referred to as orthogonal code) corresponding to the four antenna unit groups may be [1, 1, 1, 1], [1, −1, 1, −1], [1, 1, −1, −1], and [1, −1, −1, 1] respectively. However, this application is not limited thereto. Alternatively, other sequences may be used to implement orthogonalization between different antenna unit groups. For example, a discrete Fourier transform (DFT) sequence may be used. In this case, when one antenna port includes N antenna unit groups, a $k^{th}$ item of an orthogonal sequence of an $n^{th}$ antenna unit group may be: exp(−j*2*pi*k*n/N) or exp(j*2*pi*k*n/N), where k=0, . . . , N−1, and n=0, . . . , N−1.

Optionally, a time difference between two adjacent time units in the plurality of time units is less than a threshold, or two adjacent time units in the plurality of time units are consecutive in time. By way of example instead of limitation, a time unit may be an orthogonal frequency division multiplexing (OFDM) symbol, a symbol, or a symbol group.

S602: The network device receives first information from the terminal device, where the first information indicates channel information corresponding to the plurality of antenna unit groups.

After obtaining the channel information corresponding to the plurality of antenna unit groups in S601, the terminal device may send the first information to the network device, to feed back the channel information corresponding to the plurality of antenna unit groups to the network device.

Optionally, the channel information corresponding to the plurality of antenna unit groups includes phase weighting information corresponding to at least one antenna unit group in the plurality of antenna unit groups, and the phase weighting information is used by the network device to control a phase shift of a phase shifter of the at least one antenna unit group.

For M antenna unit groups included in one antenna port of the network device, after receiving reference signals from the M antenna unit groups, the terminal device may report an M-dimensional phase weighting sequence corresponding to the M antenna unit groups. If the network device includes N antenna ports, and each antenna port includes M antenna unit groups, after receiving reference signals from N·M antenna unit groups of the N antenna ports, the terminal device may report an M-dimensional phase weighting sequence corresponding to each of the N antenna ports.

The terminal device may determine, based on the reference signals, an M-dimensional phase weighting sequence corresponding to M antenna unit groups of an $n^{th}$ digital port. The M-dimensional phase weighting sequence may be denoted as $p_n$:

$$p_n = \begin{bmatrix} p_{0,n} \\ \vdots \\ p_{M-1,n} \end{bmatrix}$$

Optionally, one element in the phase weighting sequence $p_n$ is a phase weighting value corresponding to one antenna unit group, and one phase weighting value is a phase weighting value corresponding to wideband or full bandwidth. In other words, a frequency domain granularity at which the terminal device reports the phase weighting value to the network device is wideband or full bandwidth. To be specific, the terminal device reports a unique phase weighting value corresponding to a frequency domain range (the frequency domain range may be referred to as wideband or full bandwidth) to the network device. The frequency domain range may be bandwidth occupied by a CSI-RS corresponding to the phase weighting value, bandwidth of a bandwidth part (BWP), or carrier bandwidth.

Optionally, phase weighting information corresponding to at least one antenna unit group included in the first information may include the M-dimensional phase weighting sequence corresponding to one antenna port, or may include identification information corresponding to the M-dimensional phase weighting sequence.

For example, a protocol may specify a candidate set, where the candidate set includes a plurality of candidate phase weighting sequences or phase weighting values. The terminal device may determine, in the candidate set based on the M-dimensional phase weighting sequence, a phase weighting sequence or a phase weighting value corresponding to the M-dimensional phase weighting sequence, and notify the network device of the first information that includes identification information of the phase weighting sequence corresponding to the M-dimensional phase weighting sequence or identification information of the phase weighting value corresponding to the M-dimensional phase weighting sequence. After receiving the first information, the network device may determine, in the candidate set based on the identification information, the M-dimensional phase weighting sequence corresponding to the antenna port.

Optionally, the channel information of the plurality of antenna unit groups includes precoding matrix indexes PMIs corresponding to a plurality of antenna ports, and the plurality of antenna ports include the plurality of antenna unit groups.

The terminal device may determine, based on reference signals from N antenna ports of the network device (which may be reference signals from a plurality of antenna unit groups of the N antenna ports), that channels corresponding to the N antenna ports can support transmission of v data streams. The terminal device may report an N·v-dimensional precoding matrix to the network device, which may also be referred to as digital weighting information, and is used by the network device to perform digital signal processing on the data streams. The precoding matrix determined by the terminal device based on the channel information may be denoted as q:

$$q = \begin{bmatrix} q_{0,0} & \cdots & q_{0,v-1} \\ \vdots & \ddots & \vdots \\ q_{N-1,0} & \cdots & q_{N-1,v-1} \end{bmatrix}$$

After determining that the channel information of the plurality of antenna unit groups includes the precoding matrix q corresponding to the plurality of antenna ports, the terminal device may determine, in a precoding matrix set, a PMI of the precoding matrix. The first information includes the PMI.

In an implementation, the terminal device may separately report the phase weighting information and the PMI. The phase weighting information may be carried in a same message, or may be carried in different messages.

In other words, the terminal device reports two levels of weighting information to the network device, where one level is phase weighting information, and the other level is digital weighting information. However, this is not limited in this application.

In another implementation, the terminal device may combine a phase weighting sequence and digital weighting information, and feed back combining weighting information to the network device. The combining weighting information may include a combining weighting value of each antenna unit group. The combining weighting information may be denoted as:

$$\begin{bmatrix} p_0 q_{0,0} & \cdots & p_0 q_{0,v-1} \\ \vdots & \ddots & \vdots \\ p_{N-1} q_{N-1,0} & \cdots & p_{N-1} q_{N-1,v-1} \end{bmatrix}$$

The terminal device may further send second information to the network device, where the second information includes one or more pieces of the following information corresponding to the plurality of antenna ports:

a signal to interference plus noise ratio (SINR), a reference signal received power RSRP, a layer 1-signal to interference plus noise ratio L1-SINR, a layer 1-reference signal received power L1-RSRP, a channel quality indicator (CQI), and/or a rank indicator (RI).

For example, the terminal device may further obtain one or more pieces of the foregoing information by measuring the reference signals from the plurality of antenna ports, and feed back the information to the network device, so that the network device performs data transmission with reference to the foregoing information.

In a possible implementation, the first information is associated with the second information, or the second information is based on the first information.

Correspondingly, the network device may receive the second information from the terminal device.

Optionally, both the first information and the second information may be used as CSI and sent by the terminal device to the network device. The first information and the second information may be carried in a same CSI report, or may be carried in different CSI reports. This is not limited in this application.

A same CSI report may be a CSI report carried on an uplink channel (such as a physical uplink control channel (PUCCH) or a physical uplink shared channel (PUSCH)). The different CSI reports may be CSI reports carried on different uplink channels or uplink channels in different time units. However, this application is not limited thereto.

Based on the foregoing solution, the network device may send the reference signals to the terminal device by using the plurality of antenna unit groups of the antenna ports, so that the terminal device can obtain channel information with higher precision, and accuracy of channel information feedback is improved. In addition, the terminal device may determine appropriate phase weighting information based on the obtained channel information with higher precision, and feed back the appropriate phase weighting information to the network device. The network device may control a phase of a phase shifter based on the phase weighting information, to determine a downlink transmit beam. Based on the solution provided in this application, use of a large quantity of resources to perform beam training to determine a transmit beam can be avoided, resource overheads can be reduced, and resource utilization can be improved.

Embodiment 2

Figure 15:
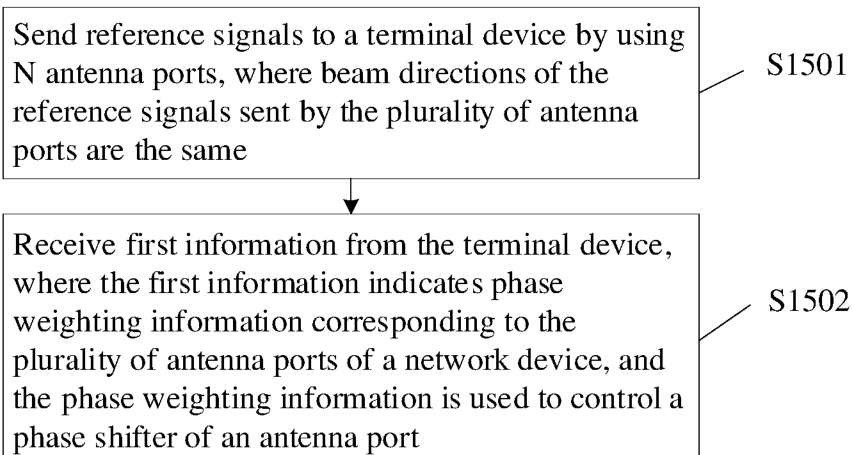
FIG. 15 is another schematic flowchart of a channel information obtaining method according to an embodiment of this application.

FIG. 15 is a schematic flowchart of a channel information obtaining method according to Embodiment 2 of this application.

S1501: A network device sends reference signals to a terminal device by using N antenna ports, where beam directions of the reference signals sent by the plurality of antenna ports are the same.

Correspondingly, the terminal device receives the plurality of reference signals from the network device.

Optionally, the N antenna ports may send the reference signals to the terminal device in one of a frequency-division multiplexing (FDM) manner, a TDM manner, a TD-CDM manner, and a frequency domain code-division multiplexing (FD-CDM) manner.

In a possible implementation, the N antenna ports may correspond to one CSI-RS resource.

That the N antenna ports may correspond to one CSI-RS resource may be understood as that the network device sends CSI-RSs on the CSI-RS resource by using the corresponding N antenna ports.

In another possible implementation, the N antenna ports correspond to a plurality of CSI-RS resources.

In other words, the network device sends a CSI-RS on at least one resource in the plurality of CSI-RS resources by using at least one antenna port in the N antenna ports. In other words, the network device sends the CSI-RSs on the plurality of CSI-RS resources by using a total of N antenna ports.

For example, the N antenna ports correspond to N CSI-RS resources, and each of the N CSI-RS resources corresponds to one antenna port. The network device may send a reference signal on one CSI-RS resource in the N CSI-RS resources by using one antenna port in the N antenna ports.

The network device configures the terminal device to measure the CSI-RS resources corresponding to the N antenna ports. When the N antenna ports correspond to different CSI-RS resources, the network device may indicate that the plurality of CSI-RS resources have a same transmit beam direction.

For example, the network device may indicate that the plurality of CSI-RS resources have a same QCL type D relationship, or the plurality of CSI-RS resources belong to one resource set, and the network device indicates that the CSI-RS resources in the CSI-RS set have a repetition relationship. For example, a configuration parameter repetition in configuration information of the resource set is set to "on", that is, resource repetition is configured to be in an enabled state, indicating that transmit beams of the CSI-RS resources in the resource set have a same beam direction.

S1502: The network device receives first information from the terminal device, where the first information indicates phase weighting information corresponding to the plurality of antenna ports of the network device, and the phase weighting information is used to control a phase shift of a phase shifter of an antenna port.

In S1502, the terminal device determines, based on the plurality of received reference signals, the phase weighting information corresponding to the plurality of antenna ports of the network device, and sends the first information to the network device, where the first information indicates the phase weighting information corresponding to the plurality of antenna ports.

The following separately describes two cases in which the N antenna ports of the network device correspond to N CSI-RS resources and the N antenna ports correspond to M CSI-RS resources.

Case 1: The N antenna ports correspond to the N CSI-RS resources.

The N CSI-RS resources are separately resources in N time units, and the network device sends CSI-RSs on the N CSI-RS resources in the N time units by using the N antenna ports. Correspondingly, the terminal device sequentially measures the N CSI-RS resources in the N time units, to obtain channel information of an antenna port corresponding to each of the N CSI-RS resources, that is, obtain channel information corresponding to the N antenna ports.

Optionally, the N time units may be N consecutive time domain symbols, for example, N consecutive OFDM symbols.

The terminal device may determine, based on the channel information corresponding to the N antenna ports that is obtained through measurement, a phase weighting value corresponding to each of the N antenna ports, and obtain a phase weighting sequence corresponding to the N antenna ports. The phase weighting sequence may be denoted as:

$$t = \begin{bmatrix} t_0 \\ \vdots \\ t_{N-1} \end{bmatrix}$$

The phase weighting sequence includes N elements. One element is a phase weighting value that corresponds to one antenna port and that is determined by the terminal device, and the phase weighting sequence may also be referred to as an N-dimensional combining weighting sequence corresponding to the N antenna ports.

The first information sent by the terminal device to the network device includes the phase weighting sequence corresponding to the N antenna ports, or the terminal device determines, in a predefined phase weighting sequence candidate set, corresponding identification information based on the phase weighting sequence corresponding to the N antenna ports. The first information includes the identification information. However, this application is not limited thereto.

In an exemplary implementation, the network device may send N reference signals to the terminal device on the N reference resources at different moments by using different antenna arrays (or referred to as antenna planar arrays), and beams used to send the N reference signals have a same or close direction (or referred to as an orientation).

Figure 16:
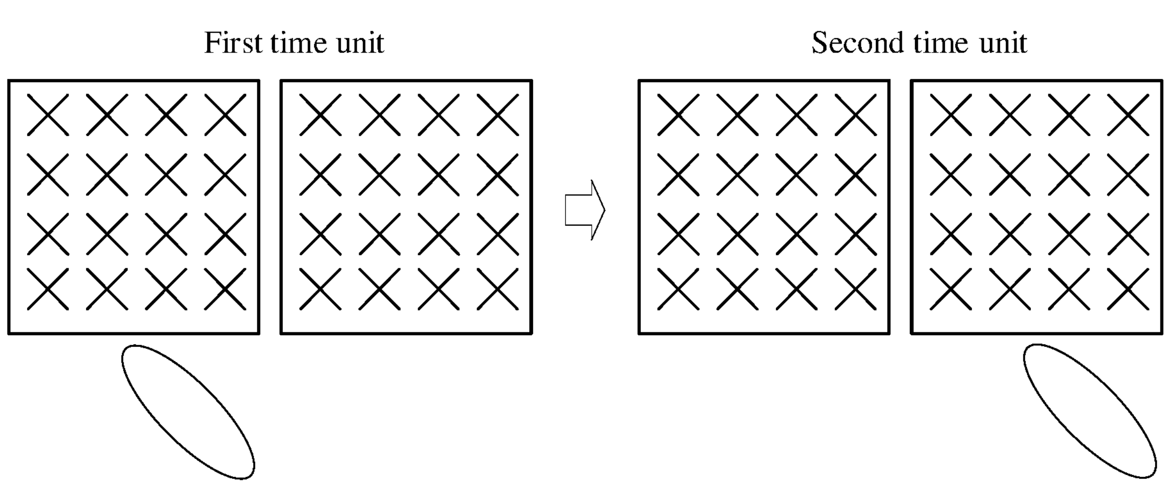
FIG. 16 is a schematic diagram of sending N reference signals at different moments by using different antenna arrays according to an embodiment of this application.

For example, as shown in FIG. 16, the network device may include two antenna arrays. One antenna array corresponds to one antenna port. The network device sends a reference signal 1 to the terminal device on a reference signal resource 1 in a first time unit by using one antenna array, that is, the reference signal 1 is sent in both polarization directions of the antenna array, and the two polarization directions form one beam to send the reference signal. The network device sends a reference signal 2 to the terminal device on a reference signal resource 2 in a second time unit by using the other antenna array. A direction of the beam used by the network device to send the reference signal 1 is the same as or close to a direction of the beam used by the network device to send the reference signal 2. Optionally, the network device may send a reference signal by using a broadened beam (a non-DFT beam).

Optionally, the terminal device may perform receive beam training in the plurality of time units by using the N antenna ports.

Because the network device sends a plurality of CSI-RS s in a same beam direction, the terminal device may perform receive beam training of the terminal device in the plurality of time units by using the N antenna ports of the CSI-RSs, to determine a receive beam used by the terminal device to perform communication with the network device. This can reduce time overheads and resource overheads.

Case 2: The N antenna ports correspond to the M CSI-RS resources.

N=2M is used as an example. To be specific, each of the M CSI-RS resources includes two antenna ports: a first antenna port and a second antenna port. The network device sends the M CSI-RS resources in M time units, and sends CSI-RSs to the terminal device in one time unit in the M time units by using two antenna ports of one CSI-RS resource.

The terminal device determines phase weighting sequences, which may also be referred to as combining weighting sequences, that correspond to M first antenna ports and M second antenna ports, and reports the phase weighting sequences to the network device. The phase weighting sequence corresponding to the M antenna ports may be denoted as:

$$t_i = \begin{bmatrix} t_{0,i} \\ \vdots \\ t_{M-1,i} \end{bmatrix}, i = 0, 1$$

i=0 represents the phase weighting sequence corresponding to the M first antenna ports, and i=1 represents the phase weighting sequence corresponding to the M second antenna ports.

In a possible implementation, the terminal device may separately report, to the network device, the phase weighting sequence corresponding to the M first antenna ports and the phase weighting sequence corresponding to the M second antenna ports, or the terminal device may report a combining weighting sequence to the network device. The combining weighting sequence is a sequence obtained after the phase weighting sequence corresponding to the M first antenna ports is combined with the phase weighting sequence corresponding to the M second antenna ports.

The first information sent by the terminal device to the network device includes the phase weighting sequence corresponding to the M first antenna ports and the phase weighting sequence corresponding to the M second antenna ports, or the first information includes the combining weighting sequence, or the first information includes identification information. The identification information is used to identify the phase weighting sequence corresponding to the M first antenna ports and the phase weighting sequence corresponding to the M second antenna ports, or is used to identify the combining weighting sequence. However, this application is not limited thereto.

In an exemplary implementation, the network device may send M reference signals on the M reference signal resources at different moments by using different antenna arrays (or referred to as antenna planar arrays), and beams used to send the M reference signal resources have a same or close orientation.

Figure 17:
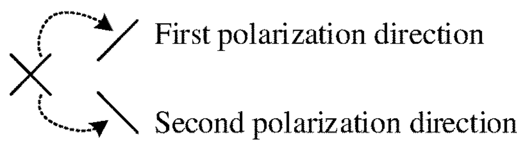
FIG. 17 is a schematic diagram of sending M reference signals at different moments by using different antenna arrays according to an embodiment of this application.
Figure 17:
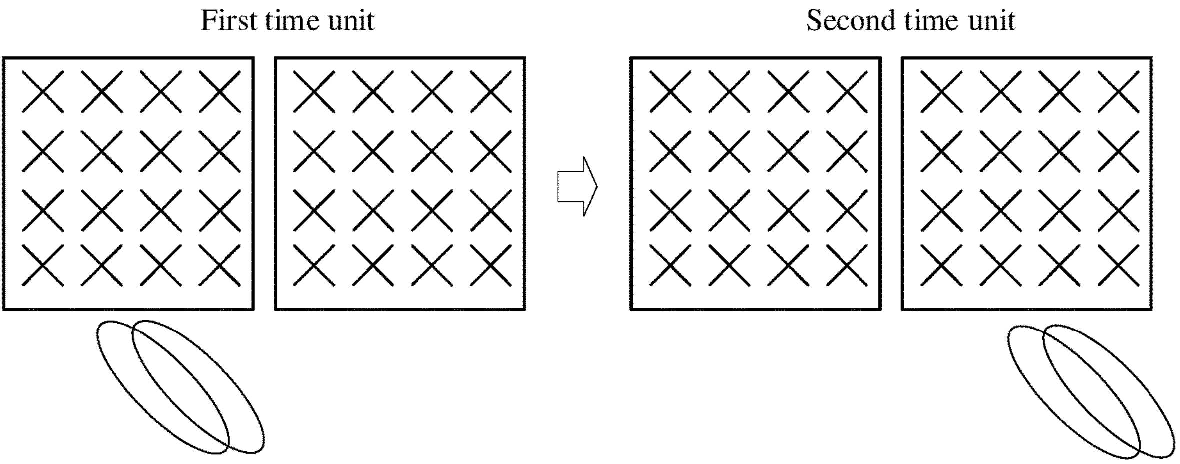

For example, as shown in FIG. 17, the network device may include two antenna arrays, two polarization directions of one antenna array correspond to two antenna ports, and the two antenna arrays include a total of four antenna ports. The network device may send a reference signal 1 to the terminal device on a reference signal resource 1 in a first time unit by using one antenna array. Antenna ports in two polarization directions of the antenna array correspond to two antenna ports of the reference signal resource 1. The network device sends a reference signal 2 to the terminal device on a reference signal resource 2 in a second time unit by using the other antenna array. Directions of beams used by the network device to send the M reference signal resources are the same or close. Optionally, the network device sends the foregoing reference signals by using a broadened beam (a non-DFT beam).

Optionally, in the foregoing two cases, the terminal device may further send second information to the network device, where the second information includes one or more pieces of the following information of the plurality of antenna ports:

a signal to interference plus noise ratio SINR, a reference signal received power RSRP, a layer 1-signal to interference plus noise ratio L1-SINR, a layer 1-reference signal received power L1-RSRP, a channel quality indicator CQI, and/or a rank indicator RI.

Optionally, the second information includes channel state information corresponding to the N antenna ports, for example, L1-RSRP information corresponding to the N antenna ports.

Optionally, the second information is associated with a phase weighting sequence reported by the terminal, or the second information is based on the phase weighting sequence reported by the terminal. For example, the reported L1-RSRP is associated with the reported phase weighting sequence, or the reported L1-RSRP is based on the reported phase weighting sequence.

Based on the foregoing solution, the network device may send the reference signals by using a broadened beam. Therefore, resource overheads caused by transmission of the reference signals to the terminal device through a plurality of beams can be reduced. After the network device obtains the phase weighting sequence fed back by the terminal device, a phase weighting value of a narrow beam served by the network device for the terminal device can be determined, so that a serving beam can be quickly determined when resource overheads of beam training are reduced.

The methods provided in embodiments of this application are described above in detail with reference to FIG. 2 to FIG. 17. The following describes apparatuses provided in embodiments of this application. To implement functions in the foregoing method provided in embodiments of this application, each network element may include a hardware structure and/or a software module, and implement the foregoing functions in a form of the hardware structure, the software module, or a combination of the hardware structure and the software module. Whether a function in the foregoing functions is performed in the manner of the hardware structure, the software module, or the combination of the hardware structure and the software module depends on particular applications and design constraint conditions of the technical solutions.

Figure 18:
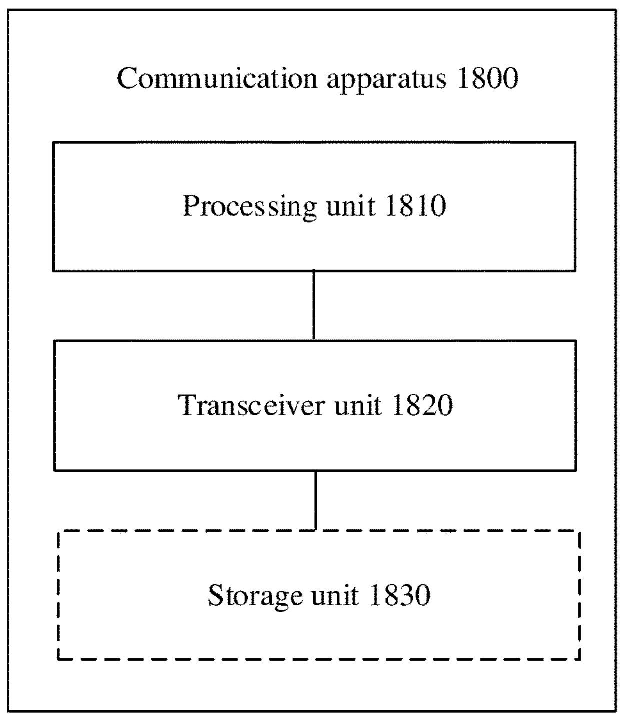
FIG. 18 is a schematic block diagram of a communication apparatus according to an embodiment of this application.

FIG. 18 is a schematic block diagram of a communication apparatus according to an embodiment of this application. As shown in FIG. 18, the communication apparatus 1800 may include a processing unit 1810 and a transceiver unit 1820.

In a possible design, the communication apparatus 1800 may correspond to the terminal device in the foregoing method embodiment, or a chip configured in (or used for) the terminal device, or another apparatus, module, circuit, unit, or the like that can implement a method performed by the terminal device.

The transceiver unit is configured to receive a plurality of reference signals from a network device. The processing unit is configured to determine, based on the plurality of reference signals, channel information corresponding to a plurality of antenna unit groups of the network device, where at least two antenna unit groups of the plurality of antenna unit groups belong to one antenna port. The transceiver unit is further configured to send first information to the network device, where the first information indicates the channel information corresponding to the plurality of antenna unit groups.

Optionally, the channel information of the plurality of antenna unit groups includes precoding matrix indexes (PMIs) corresponding to a plurality of antenna ports, and the plurality of antenna ports include the plurality of antenna unit groups.

Optionally, the plurality of antenna unit groups belong to one antenna port, or one antenna unit group in the plurality of antenna unit groups belongs to one antenna port.

Optionally, the plurality of antenna unit groups belong to one antenna port; and the transceiver unit is configured to receive the plurality of reference signals from the network device in a plurality of time units.

Optionally, the transceiver unit is configured to receive, in one time unit in the plurality of time units, a reference signal sent by the network device through one antenna unit group in the plurality of antenna unit groups, where reference signals received by different time units in the plurality of time units come from different antenna unit groups of the plurality of antenna unit groups.

Optionally, the transceiver unit is configured to receive the plurality of reference signals in each of the plurality of time units.

Optionally, the processing unit is configured to determine, based on the plurality of reference signals, a quantity of the plurality of antenna unit groups, and weighting sequences corresponding to the plurality of antenna unit groups, the channel information of the plurality of antenna unit groups.

Optionally, the channel information of the plurality of antenna unit groups includes digital weighting information of antenna ports, where the digital weighting information is used by the network device to perform digital signal processing on to-be-sent signals of antenna ports to which the plurality of antenna unit groups belong.

Optionally, the channel information of the plurality of antenna unit groups includes combining weighting information corresponding to the plurality of antenna unit groups, and the combining weighting information is weighting information obtained after phase weighting information corresponding to the plurality of antenna unit groups is combined with PMIs corresponding to the plurality of antenna unit groups; and the phase weighting information is used by the network device to control a phase shift of a phase shifter of the at least one antenna unit group.

Optionally, the transceiver unit is further configured to receive configuration information from the network device, where the configuration information indicates an antenna unit group included in at least one antenna port of the network device.

Optionally, the transceiver unit is further configured to send second information to the network device, where the second information includes one or more pieces of the following information of the plurality of antenna unit groups: a signal to interference plus noise ratio SINR, a reference signal received power RSRP, a channel quality indicator CQI, and/or a rank indicator RI. It should be understood that the communication apparatus 1800 may correspond to the terminal device in the methods 600 and 1500 in embodiments of this application. The communication apparatus 1800 may include the units configured to perform the methods performed by the terminal device in the methods 600 and 1500 in FIG. 6 and FIG. 15. In addition, the units in the communication apparatus 1800 and the foregoing other operations and/or functions are respectively used to implement corresponding procedures of the methods 600 and 1500 in FIG. 6 and FIG. 15.

Optionally, the communication apparatus 1800 may further include the processing unit 1810. The processing unit 1810 may be configured to process instructions or data, to implement a corresponding operation.

It should be further understood that when the communication apparatus 1800 is a chip configured in (or used for) the terminal device, the transceiver unit 1820 in the communication apparatus 1800 may be an input/output interface or circuit of the chip, and the processing unit 1810 in the communication apparatus 1800 may be a processor in the chip.

Optionally, the communication apparatus 1800 may further include a storage unit 1830. The storage unit 1830 may be configured to store instructions or data. The processing unit 1810 may execute the instructions or data stored in the storage unit, so that the communication apparatus implements a corresponding operation.

Figure 19:
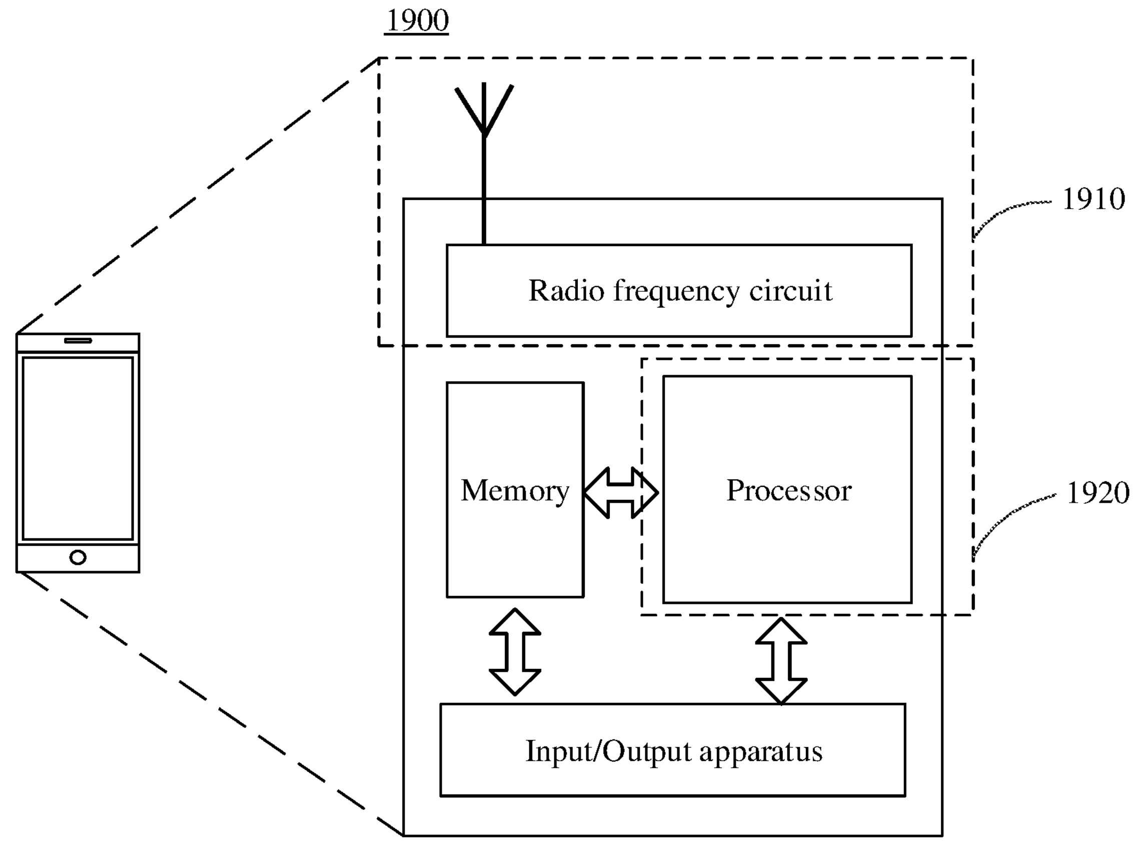
FIG. 19 is a schematic diagram of a structure of a terminal device according to an embodiment of this application.

It should be understood that the transceiver unit 1820 in the communication apparatus 1800 may be implemented through a communication interface (for example, a transceiver or an input/output interface), for example, may correspond to the transceiver 1910 in the terminal device 1900 shown in FIG. 19. The processing unit 1810 in the communication apparatus 1800 may be implemented through at least one processor, for example, may correspond to the processor 1920 in the terminal device 1900 shown in FIG. 19. The processing unit 1810 in the communication apparatus 1800 may alternatively be implemented through at least one logic circuit. The storage unit 1830 in the communication apparatus 1800 may correspond to the memory in the terminal device 1900 shown in FIG. 19.

It should be further understood that an exemplary process in which the units perform the foregoing corresponding steps is described in detail in the foregoing method embodiments, and for brevity, details are not described herein again.

In another possible design, the communication apparatus 1800 may correspond to the network device in the foregoing method embodiment, or a chip configured in (or used for)

the network device, or another apparatus, module, circuit, unit, or the like that can implement a method performed by the network device.

The transceiver unit is configured to send reference signals to a terminal device by using a plurality of antenna unit groups, where at least two antenna unit groups in the plurality of antenna unit groups belong to one antenna port. The transceiver unit is further configured to receive first information from the terminal device, where the first information indicates channel information corresponding to the plurality of antenna unit groups. The processing unit is configured to determine, based on the first information, the channel information corresponding to the plurality of antenna unit groups.

Optionally, the channel information corresponding to the plurality of antenna unit groups includes phase weighting information corresponding to at least one antenna unit group in the plurality of antenna unit groups, and the phase weighting information is used by the network device to control a phase shift of a phase shifter of the at least one antenna unit group.

Optionally, the plurality of antenna unit groups belong to one antenna port, or one antenna unit group in the plurality of antenna unit groups belongs to one antenna port.

Optionally, the plurality of antenna unit groups belong to one antenna port, and the transceiver unit is configured to send the reference signals to the terminal device in a plurality of time units by using the plurality of antenna unit groups.

Optionally, the transceiver unit is configured to send a reference signal to the terminal device in one time unit in the plurality of time units by using one antenna unit group in the plurality of antenna unit groups, where antenna unit groups used for sending the reference signals in different time units in the plurality of time units are different.

Optionally, the transceiver unit is configured to send the reference signals to the terminal device in each of the plurality of time units by using the plurality of antenna unit groups, where phase weighting sequences corresponding to different antenna unit groups in the plurality of antenna unit groups are orthogonal to each other, and one element in one phase weighting sequence is a phase weighting value corresponding to one antenna unit group in one time unit.

Optionally, a time difference between two adjacent time units in the plurality of time units is less than a threshold, or two adjacent time units in the plurality of time units are consecutive in time.

Optionally, the channel information corresponding to the plurality of antenna unit groups includes precoding matrix indexes (PMIs) corresponding to a plurality of antenna ports, and the plurality of antenna ports include the plurality of antenna unit groups.

Optionally, the transceiver unit is further configured to send configuration information to the terminal device, where the configuration information indicates an antenna unit group included in at least one antenna port of the network device.

Optionally, the transceiver unit is further configured to receive second information from the terminal device, where the second information includes one or more pieces of the following information of the plurality of antenna unit groups: a signal to interference plus noise ratio SINR, a reference signal received power RSRP, a channel quality indicator CQI, and/or a rank indicator RI.

It should be understood that the communication apparatus 1800 may correspond to the network device in the methods 600 and 1500 in embodiments of this application. The communication apparatus 1800 may include the units configured to perform the methods performed by the network device in the methods 600 and 1500 in FIG. 6 and FIG. 15. In addition, the units in the communication apparatus 1800 and the foregoing other operations and/or functions are respectively used to implement corresponding procedures of the methods 600 and 1500 in FIG. 6 and FIG. 15.

Optionally, the communication apparatus 1800 may further include the processing unit 1810. The processing unit 1810 may be configured to process instructions or data, to implement a corresponding operation.

It should be further understood that when the communication apparatus 1800 is a chip configured in (or used for) the network device, the transceiver unit 1820 in the communication apparatus 1800 may be an input/output interface or circuit of the chip, and the processing unit 1810 in the communication apparatus 1800 may be a processor in the chip.

Optionally, the communication apparatus 1800 may further include a storage unit 1830. The storage unit 1830 may be configured to store instructions or data. The processing unit 1810 may execute the instructions or data stored in the storage unit, so that the communication apparatus implements a corresponding operation.

Figure 20:
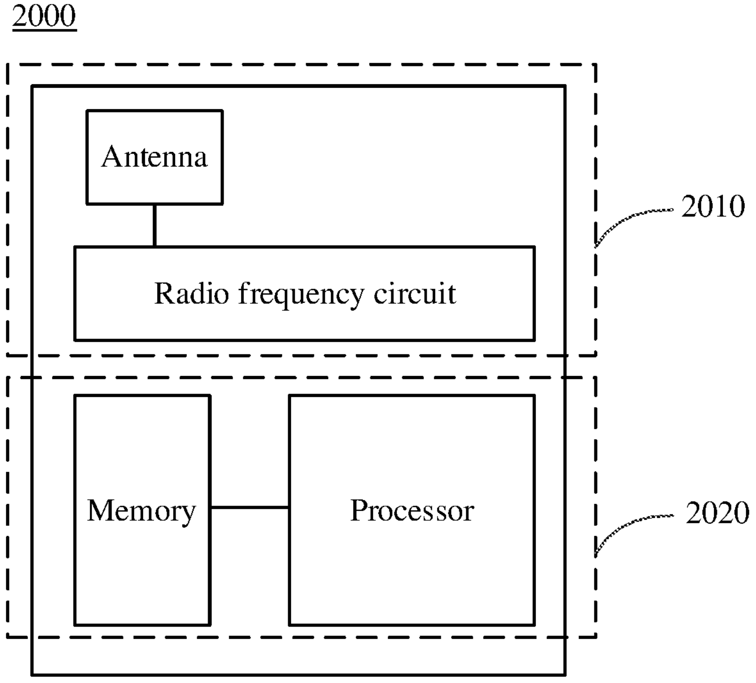
FIG. 20 is a schematic diagram of a structure of a network device according to an embodiment of this application.

It should be understood that when the communication apparatus 1800 is a network device, the transceiver unit 1820 in the communication apparatus 1800 may be implemented through a communication interface (for example, a transceiver or an input/output interface), for example, may correspond to the transceiver 2010 in the network device 2000 shown in FIG. 20. The processing unit 1810 in the communication apparatus 1800 may be implemented through at least one processor, for example, may correspond to the processor 2020 in the network device 2000 shown in FIG. 20. The processing unit 1810 in the communication apparatus 1800 may be implemented through at least one logic circuit.

It should be further understood that an exemplary process in which the units perform the foregoing corresponding steps is described in detail in the foregoing method embodiments, and for brevity, details are not described herein again.

FIG. 19 is a schematic diagram of a structure of a terminal device 1900 according to an embodiment of this application. The terminal device 1900 may be used in the system shown in FIG. 1, to perform functions of the terminal device in the foregoing method embodiments. As shown in the figure, the terminal device 1900 includes a processor 1920 and a transceiver 1910. Optionally, the terminal device 1900 further includes a memory. The processor 1920, the transceiver 1910, and the memory may communicate with each other through an internal connection path, to transmit a control signal and/or a data signal. The memory is configured to store a computer program, and the processor 1920 is configured to execute the computer program in the memory, to control the transceiver 1910 to receive and send a signal.

The processor 1920 and the memory may be integrated into one processing apparatus. The processor 1920 is configured to execute program code stored in the memory to implement the foregoing functions. During an exemplary implementation, the memory may alternatively be integrated into the processor 1920, or may be independent of the processor 1920. The processor 1920 may correspond to the processing unit in FIG. 18.

The transceiver 1910 may correspond to the transceiver unit in FIG. 18. The transceiver 1910 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 1900 shown in FIG. 19 can implement processes related to the terminal device in the method embodiments shown in FIG. 6 and FIG. 15. The operations and/or the functions of the modules in the terminal device 1900 are separately for implementing corresponding procedures in the foregoing method embodiments. For details, refer to the descriptions in the foregoing method embodiments. To avoid repetition, detailed descriptions are appropriately omitted herein.

The processor 1920 may be configured to perform an action that is implemented inside the terminal device and that is described in the foregoing method embodiments. The transceiver 1910 may be configured to perform a sending action by the terminal device for the network device or a receiving action from the network device in the foregoing method embodiments. For details, refer to the descriptions in the foregoing method embodiments. Details are not described herein again.

Optionally, the terminal device 1900 may further include a power supply, configured to supply power to various components or circuits in the terminal device.

In addition, to make functions of the terminal device more perfect, the terminal device 1900 may further include an input/output apparatus, for example, include one or more of an input unit, a display unit, an audio circuit, a camera, a sensor, and the like, and the audio circuit may further include a speaker, a microphone, and the like.

FIG. 6 and FIG. 15 are schematic diagrams of a structure of a network device according to an embodiment of this application. The network device 2000 may be used in the system shown in FIG. 1, and perform functions of the network device in the foregoing method embodiments. As shown in FIG. 6 and FIG. 15, the network device 2000 includes a processor 2020 and a transceiver 2010. Optionally, the network device 2000 further includes a memory. The processor 2020, the transceiver 2010, and the memory may communicate with each other through an internal connection path, to transmit a control signal and/or a data signal. The memory is configured to store a computer program, and the processor 2020 is configured to execute the computer program in the memory, to control the transceiver 2010 to receive and send a signal.

The processor 2020 and the memory may be integrated into one processing apparatus. The processor 2020 is configured to execute program code stored in the memory to implement the foregoing functions. During an exemplary implementation, the memory may alternatively be integrated into the processor 2020, or may be independent of the processor 2020. The processor 2020 may correspond to the processing unit in FIG. 18.

The transceiver 2010 may correspond to the transceiver unit in FIG. 18. The transceiver 2010 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the network device 2000 shown in FIG. 6 and FIG. 15 can implement processes related to the network device in the method embodiments shown in FIG. 6 and FIG. 15. The operations and/or the functions of the modules in the network device 2000 are separately for implementing corresponding procedures in the foregoing method embodiments. For details, refer to the descriptions in the foregoing method embodiments. To avoid repetition, detailed descriptions are appropriately omitted herein.

It should be understood that the network device 2000 shown in FIG. 6 and FIG. 15 may be an eNB or a gNB. Optionally, the network device includes a network device such as a CU, a DU, an AAU, or the like. Optionally, the CU may be classified into a CU-CP and a CU-UP. A specific architecture of the network device is not limited in this application.

It should be understood that the network device 2000 shown in FIG. 6 and FIG. 15 may be a CU node or a CU-CP node.

The processor 2020 may be configured to perform an action that is implemented inside the network device and that is described in the foregoing method embodiments. The transceiver 2010 may be configured to perform a sending action by the network device for the terminal device or a receiving action from the terminal device in the foregoing method embodiments. For details, refer to the descriptions in the foregoing method embodiments. Details are not described herein again.

An embodiment of this application further provides a processing apparatus, including a processor and a (communication) interface. The processor is configured to perform the method in any one of the foregoing method embodiments.

It should be understood that the processing apparatus may be one or more chips. For example, the processing apparatus may be a field programmable gate array (FPGA), an application specific integrated chip (ASIC), a system on chip (SoC), a central processing unit (CPU), a network processor (NP), a digital signal processing circuit (DSP), a micro controller unit (MCU), a programmable controller (programmable logic device, PLD), or another integrated chip.

Based on the methods provided in embodiments of this application, this application further provides a computer program product. The computer program product includes computer program code. When the computer program code is executed by one or more processors, an apparatus including the processor is enabled to perform the methods in the embodiments shown in FIG. 6 and FIG. 15.

All or some of the technical solutions provided in embodiments of this application may be implemented through software, hardware, firmware, or any combination thereof. When software is used to implement the technical solutions, all or some of the technical solutions may be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, a network device, a terminal device, a core network device, a machine learning device, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a data subscriber line (digital subscriber line, DSL)) or wireless (for example, infrared, wireless, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

Based on the methods provided in embodiments of this application, this application further provides a computer-readable storage medium. The computer-readable storage medium stores program code. When the program code is executed by one or more processors, an apparatus including the processor is enabled to perform the methods in the embodiments shown in FIG. 6 and FIG. 15.

Based on the methods provided in embodiments of this application, this application further provides a system, including the foregoing one or more network devices. The system may further include the foregoing one or more terminal devices.

In several embodiments provided in this application, it should be understood that the disclosed system, apparatus, and method may be implemented in another manner. For example, the described apparatus embodiments are merely examples. For example, division into the units is merely logic function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing descriptions are merely exemplary implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel information obtaining method, comprising:

sending, by a network device, reference signals to a terminal device in a plurality of time units using a plurality of antenna unit groups, wherein the plurality of antenna unit groups belong to one antenna port; and receiving, by the network device, first information from the terminal device, wherein the first information indicates channel information corresponding to the plurality of antenna unit groups, wherein the sending, by the network device, the reference signals to the terminal device in the plurality of time units using the plurality of antenna unit groups comprises:

sending, by the network device, the reference signals to the terminal device in each of the plurality of time units using the plurality of antenna unit groups, wherein weighting sequences corresponding to different antenna unit groups of the plurality of antenna unit groups are orthogonal to each other, and one element in one weighting sequence is a phase weighting value corresponding to one antenna unit group in one time unit.

2. The method according to claim 1, wherein the channel information corresponding to the plurality of antenna unit groups comprises phase weighting information corresponding to at least one antenna unit group of the plurality of antenna unit groups, and the phase weighting information is used by the network device to control a phase shift of a phase shifter of the at least one antenna unit group.

3. The method according to claim 1, wherein a time difference between two adjacent time units of the plurality of time units is less than a threshold, or two adjacent time units of the plurality of time units are consecutive in time.

4. The method according to claim 1, wherein the channel information corresponding to the plurality of antenna unit groups comprises precoding matrix indexes (PMIs) corresponding to a plurality of antenna ports, and the plurality of antenna ports comprise the plurality of antenna unit groups.

5. A channel measurement method, comprising:

receiving, by a terminal device, a plurality of reference signals from a network device;

determining, by the terminal device based on the plurality of reference signals, channel information corresponding to a plurality of antenna unit groups of the network device, wherein at least two antenna unit groups of the plurality of antenna unit groups belong to one antenna port; and sending, by the terminal device, first information to the network device, wherein the first information indicates the channel information corresponding to the plurality of antenna unit groups, wherein the channel information corresponding to the plurality of antenna unit groups comprises combined weighting information corresponding to the plurality of antenna unit groups, and the combined weighting information is weighting information obtained after phase weighting information corresponding to the plurality of antenna unit groups is combined with precoding matrix indexes (PMIs) corresponding to the plurality of antenna unit groups; and the phase weighting information is used by the network device to control a phase shift of a phase shifter of at least one antenna unit group.

6. The method according to claim 5, wherein the channel information corresponding to the plurality of antenna unit groups comprises precoding matrix indexes (PMIs) corresponding to a plurality of antenna ports, and the plurality of antenna ports comprise the plurality of antenna unit groups.

7. The method according to claim 5, wherein the plurality of antenna unit groups belong to one antenna port, or one antenna unit group of the plurality of antenna unit groups belongs to one antenna port.

8. The method according to claim 5, wherein the plurality of antenna unit groups belong to one antenna port; and the receiving, by the terminal device, the plurality of reference signals from the network device comprises:

receiving, by the terminal device, the plurality of reference signals from the network device in a plurality of time units.

9. The method according to claim 5, wherein the determining, by the terminal device based on the plurality of reference signals, the channel information corresponding to the plurality of antenna unit groups of the network device comprises:

determining, by the terminal device based on the plurality of reference signals, a quantity of the plurality of antenna unit groups, and weighting sequences corresponding to the plurality of antenna unit groups, the channel information corresponding to the plurality of antenna unit groups.

10. A channel measurement apparatus, comprising:

a processor; and a non-transitory computer-readable storage medium storing a program to be executed by the processor, the program including instructions to:

receive a plurality of reference signals from a network device;

determine, based on the plurality of reference signals, channel information corresponding to a plurality of antenna unit groups of the network device, wherein at least two antenna unit groups of the plurality of antenna unit groups belong to one antenna port; and send first information to the network device, wherein the first information indicates the channel information corresponding to the plurality of antenna unit groups, wherein the channel information corresponding to the plurality of antenna unit groups comprises combined weighting information corresponding to the plurality of antenna unit groups, and the combined weighting information is weighting information obtained after phase weighting information corresponding to the plurality of antenna unit groups is combined with precoding matrix indexes (PMIs) corresponding to the plurality of antenna unit groups; and the phase weighting information is used by the network device to control a phase shift of a phase shifter of at least one antenna unit group.

11. The apparatus according to claim 10, wherein the channel information corresponding to the plurality of antenna unit groups comprises precoding matrix indexes (PMIs) corresponding to a plurality of antenna ports, and the plurality of antenna ports comprise the plurality of antenna unit groups.

12. The apparatus according to claim 10, wherein the plurality of antenna unit groups belong to one antenna port, or one antenna unit group of the plurality of antenna unit groups belongs to one antenna port.

13. The apparatus according to claim 10, wherein the plurality of antenna unit groups belong to one antenna port; and the program including instructions to receive the plurality of reference signals from the network device in a plurality of time units.

14. The apparatus according to claim 10, wherein the program including instructions to determine, based on the plurality of reference signals, a quantity of the plurality of antenna unit groups, and weighting sequences corresponding to the plurality of antenna unit groups, the channel information corresponding to the plurality of antenna unit groups.

* * * * *